United States Patent
Takahashi

(10) Patent No.: US 12,014,654 B2
(45) Date of Patent: Jun. 18, 2024

(54) INFORMATION PROCESSING APPARATUS, INFORMATION SYSTEM, INFORMATION PROCESSING METHOD, AND PROGRAM

(71) Applicant: STROLY INC., Kyoto (JP)

(72) Inventor: Toru Takahashi, Kyoto (JP)

(73) Assignee: STROLY INC., Kyoto (JP)

( * ) Notice: Subject to any disclaimer, the term of this patent is extended or adjusted under 35 U.S.C. 154(b) by 725 days.

(21) Appl. No.: 16/652,767

(22) PCT Filed: Oct. 3, 2017

(86) PCT No.: PCT/JP2017/035966
§ 371 (c)(1),
(2) Date: Apr. 1, 2020

(87) PCT Pub. No.: WO2019/069366
PCT Pub. Date: Apr. 11, 2019

(65) Prior Publication Data
US 2020/0234613 A1    Jul. 23, 2020

(51) Int. Cl.
*G09B 29/10* (2006.01)
(52) U.S. Cl.
CPC .................. *G09B 29/106* (2013.01)
(58) Field of Classification Search
CPC ........ G09B 29/10; G09B 29/16; G01C 21/26; G08G 1/137
See application file for complete search history.

(56) References Cited

U.S. PATENT DOCUMENTS 5,636,122 A * 6/1997 Shah ...................... G08G 1/127
  701/454
6,339,745 B1 * 1/2002 Novik .................... G08G 1/123
  701/484

(Continued)

FOREIGN PATENT DOCUMENTS

JP      2004-163592 A    6/2004
JP      2004282301 A    10/2004

(Continued)

OTHER PUBLICATIONS

The Second Office Action issued in corresponding CN Application No. 201780095524.5, dated Jan. 19, 2022 w/ Machine English Translation.

(Continued)

*Primary Examiner* — Kurt Fernstrom
(74) *Attorney, Agent, or Firm* — Rimon P.C.

(57) ABSTRACT

An information processing apparatus includes: a map expression data storage unit in which two or more pieces of map expression data are stored; a position specifying information storage unit in which one or more pieces of position specifying information are stored in association with the map expression data; a request instruction receiving unit that receives a request instruction containing specifying information for specifying map expression data, from a terminal apparatus; a data acquiring unit that acquires map user information having map user information specified with the specifying information, and one or more pieces of position specifying information associated with the map user information; and a transmitting unit that transmits position added map expression data in which a position specified with the map user information, or the position specifying information contained in the map user information is shown on the map expression data, to the terminal apparatus.

13 Claims, 20 Drawing Sheets

(56) References Cited

U.S. PATENT DOCUMENTS

| | | | | |
|---|---|---|---|---|
| 7,074,185 | B2* | 7/2006 | Takeuchi | G16H 40/63 |
| | | | | 600/437 |
| 8,021,156 | B2* | 9/2011 | Sweeney | G09B 19/18 |
| | | | | 434/107 |
| 8,115,642 | B2* | 2/2012 | Thompson | A01K 15/023 |
| | | | | 340/573.3 |
| 8,131,298 | B1* | 3/2012 | Beyer, Jr. | H04W 4/02 |
| | | | | 370/332 |
| 8,146,009 | B2* | 3/2012 | Mason | G06Q 10/0631 |
| | | | | 715/767 |
| 8,836,490 | B2* | 9/2014 | Silzer, Sr. | G05D 1/0278 |
| | | | | 340/988 |
| 9,460,410 | B2* | 10/2016 | Hill | G06Q 10/0631 |
| 2001/0022585 | A1* | 9/2001 | Endo | G01C 21/367 |
| | | | | 701/25 |
| 2006/0080030 | A1* | 4/2006 | Okude | G09B 29/106 |
| | | | | 701/452 |
| 2006/0099959 | A1* | 5/2006 | Staton | G07C 9/28 |
| | | | | 455/456.1 |
| 2008/0187899 | A1* | 8/2008 | Cabrera | A63H 33/046 |
| | | | | 446/124 |
| 2008/0193907 | A1* | 8/2008 | Pauwels | G09B 19/00 |
| | | | | 434/322 |
| 2009/0234572 | A1* | 9/2009 | Matsuo | G06F 16/29 |
| | | | | 701/533 |
| 2010/0077359 | A1* | 3/2010 | Shinawaki | G09B 29/10 |
| | | | | 715/846 |
| 2010/0194783 | A1* | 8/2010 | Kanamaru | G09B 29/10 |
| | | | | 345/660 |
| 2011/0035098 | A1* | 2/2011 | Goto | G09B 29/007 |
| | | | | 701/36 |
| 2011/0122153 | A1* | 5/2011 | Okamura | G06F 16/58 |
| | | | | 345/629 |
| 2011/0187741 | A1* | 8/2011 | Akiya | G09B 29/10 |
| | | | | 345/625 |
| 2019/0050092 | A1* | 2/2019 | Yamashita | G06Q 50/30 |

FOREIGN PATENT DOCUMENTS

| | | |
|---|---|---|
| JP | 2008182612 A | 8/2008 |
| JP | 2011-154172 A | 8/2011 |
| JP | 2011-158518 A | 8/2011 |
| WO | 2017156406 A1 | 9/2017 |

OTHER PUBLICATIONS

Extended European Search Report dated Feb. 25, 2021, issued in EP Application No. 17927881.7.
First Office Action issued in Chinese Patent Application No. 201780095524.5, dated May 6, 2021 w/English Machine Translation.
International Search Report issued in corresponding International Application No. PCT/JP2017/035966, dated Dec. 26, 2017, with English translation.
Office Action issued in the corresponding Japanese Patent Application No. 2019-546436 dated Oct. 25, 2022 (11 pages).
Decision of Refusal issued in Japanese Patent Application No. 2019-546436, dated Mar. 7, 2023; with English translation.
Decision of Dismissal of Amendment issued in Japanese Patent Application No. 2019-546436, dated Mar. 7, 2023; with English translation.

* cited by examiner

| ID | Static attribute value | | | | Dynamic attribute value | | | | Map expression data | Flag |
|---|---|---|---|---|---|---|---|---|---|---|
| | Region specifying information | Scale factor | Area | Completion level | Metadata | User action information | | | | |
| | | | | | | Number of DLs | Number of views per month | Average access time | Evaluation value | | |
| M01 | $(x_{11}, y_{11})$ $(x_{12}, y_{12})$ | 1/10,000 | 28,000 | 4 | Illustrated map | 2310 | 328 | 5 m 12 s | 3.5 | | 0 |
| M02 | $(x_{21}, y_{21})$ $(x_{22}, y_{22})$ | 1/5,000 | 3,500 | 5 | Old map | 15708 | 1295 | 3 m 18 s | 4.5 | | 1 |
| M03 | $(x_{31}, y_{31})$ $(x_{32}, y_{32})$ $(x_{33}, y_{33})$ $(x_{34}, y_{34})$ $(x_{35}, y_{35})$ $(x_{36}, y_{36})$ $(x_{37}, y_{37})$ $(x_{38}, y_{38})$ | 1/8,000 | 5,400 | 3 | Old map | 239 | 58 | 1 m 50 s | 4.1 | | 1 |
| ... | ... | ... | ... | ... | ... | ... | ... | ... | ... | ... | ... |

FIG.10

| User identifier | User attribute | | | History information | | | | Current information | | | |
|---|---|---|---|---|---|---|---|---|---|---|---|
| | Age | Sex | ... | Browsing date | Browsed map identifier | Browsing time | ... | Map identifier of current browsing | Browsing time | User position information | ... | User flag |
| U01 | 38 | Male | ... | 2017/4/5 | M09 | 5 m 10 s | ... | M02 | 1 m 05 s | $(x_{01}, y_{01})$ | ... | 1 |
| | | | | 2017/7/8 | M01 | 2 m 18 s | | | | | | |
| | | | | 2017/8/15 | M29 | 1 m 10 s | | | | | | |
| U02 | 25 | Female | ... | 2017/8/11 | M05 | 6 m 11 s | ... | - | - | $(x_c, y_c)$ | ... | 1 |
| | | | | ... | ... | ... | | | | | | |
| U03 | 49 | Male | ... | 2017/7/21 | M02 | 3 m 17 s | ... | M01 | 51 s | $(x_{03}, y_{03})$ | ... | 1 |
| | | | | ... | ... | ... | | | | | | |
| ... | ... | ... | ... | ... | ... | ... | ... | ... | ... | ... | ... | ... |

FIG. 11

| ID | Place name information | Position information |
|---|---|---|
| 1 | A point | $(X_a, Y_a)$ |
| 2 | B point | $(X_b, Y_b)$ |
| ⋮ | ⋮ | ⋮ |

FIG.12

INFORMATION PROCESSING APPARATUS, INFORMATION SYSTEM, INFORMATION PROCESSING METHOD, AND PROGRAM

CROSS REFERENCE

This patent application is the U.S. National Phase under 35 U.S.C. § 371 of International Application No. PCT/JP2017/035966, filed on Oct. 3, 2017, which the entire content of is hereby incorporated by reference.

BACKGROUND ART

The present invention relates to an information processing apparatus and the like for providing map expression data.

BACKGROUND ART

Conventionally, there is a system in which geographical information can be added to a hand-written map or the like and browsed (see Patent Document 1, for example). This system is a map information system including one or more terminal apparatuses and a server apparatus, wherein each terminal apparatus includes a terminal information transmitting unit that transmits terminal information having a map identifier of a map that is being output and current position information to the server apparatus, a point information receiving unit that receives point information, which is information regarding a point on a map, from the server apparatus, and an information output unit that outputs output information, which is information corresponding to the point information, and the server apparatus includes a map information storage unit in which position correspondence information, which is a pair of absolute position information and relative position information, is stored for each map identifier, a terminal information receiving unit that receives the terminal information, a point information acquiring unit that acquires point information using the terminal information, and a point information transmitting unit that transmits the point information to the terminal apparatus.

CITATION LIST

Patent Document

Patent Document 1: JP 2011-154172A

SUMMARY OF INVENTION

Technical Problem

However, according to conventional techniques, it is not possible to show a position of another user, on map expression data. The map expression data is information in which a geographical region that is expressed is limited, and examples thereof include information such as an old map, an illustrated map, a sketch map, a hand-written map, and the like.

Solution to Problem

A first aspect of the present invention is directed to an information processing apparatus including: a map expression data storage unit in which two or more pieces of map expression data expressing a map are stored, the data being associated with one or more attribute values containing region specifying information for specifying a region that is being expressed; a position specifying information storage unit in which position specifying information for specifying positions of one or more users is stored in association with each of the two or more pieces of map expression data; a request instruction receiving unit that receives a request instruction, which is an instruction to transmit map expression data and contains specifying information for specifying map expression data, from a terminal apparatus; a data acquiring unit that acquires map user information having map expression data specified with the specifying information contained in the request instruction on the map expression data, and one or more pieces of position specifying information associated with the map expression data; and a transmitting unit that transmits position added map expression data in which a position specified with the map user information acquired by the data acquiring unit or with the position specifying information contained in the map user information is shown on the map expression data, to the terminal apparatus.

With this configuration, it is possible to show a position of another user, on map expression data.

Furthermore, a second aspect of the present invention is directed to the information processing apparatus according to the first aspect, wherein, in the position specifying information storage unit, position specifying information of one or more users satisfying a predetermined condition is stored.

With this configuration, it is possible to show a position of another user satisfying a predetermined condition, on map expression data.

Furthermore, a third aspect of the present invention is directed to the information processing apparatus according to the second aspect, wherein the position specifying information satisfying a predetermined condition has position specifying information indicating a position of a terminal apparatus corresponding to the map expression data.

With this configuration, it is possible to show a position of another user corresponding to map expression data, on the map expression data.

Furthermore, a fourth aspect of the present invention is directed to the information processing apparatus according to the third aspect, wherein the terminal apparatus corresponding to the map expression data is a terminal apparatus in a state of satisfying a predetermined condition for the map expression data.

With this configuration, it is possible to show a position of another terminal apparatus in a state of satisfying a predetermined condition for the map expression data, on the map expression data.

Furthermore, a fifth aspect of the present invention is directed to the information processing apparatus according to the fourth aspect, wherein the state of satisfying a predetermined condition for the map expression data is a state in which the map expression data is being output by the terminal apparatus.

With this configuration, it is possible to show a position of another terminal apparatus that is outputting map expression data, on the map expression data.

Furthermore, a sixth aspect of the present invention is directed to the information processing apparatus according to the fourth aspect, wherein the state of satisfying a predetermined condition for the map expression data is a state in which the map expression data is stored in the terminal apparatus.

With this configuration, it is possible to show a position of another terminal apparatus in which map expression data is stored, on the map expression data.

Furthermore, a seventh aspect of the present invention is directed to the information processing apparatus according to the second aspect, further including a user information storage unit in which one or more pieces of user information having a user identifier for identifying a user are stored, wherein the position specifying information in the position specifying information storage unit is associated with the user identifier, and the position specifying information satisfying a predetermined condition is position specifying information corresponding to the user identifier stored in the user information storage unit.

With this configuration, it is possible to show a position of a registered user, on map expression data.

Furthermore, an eighth aspect of the present invention is directed to the information processing apparatus according to any one of the first to seventh aspects, wherein the transmitting unit transmits the map user information having the map expression data and the one or more pieces of position specifying information, or the position added map expression data, to the terminal apparatus only in a case in which a predetermined condition is satisfied.

With this configuration, it is possible to show a position of a user, only in a case in which a predetermined condition is satisfied.

Furthermore, a ninth aspect of the present invention is directed to the information processing apparatus according to the eighth aspect, wherein the predetermined condition is that a flag indicating that a position specified with the position specifying information is to be shown is associated with the map expression data in the map expression data storage unit, or one or more attribute values associated with the map expression data in the map expression data storage unit satisfy a predetermined condition.

With this configuration, it is possible to show a position of another user as appropriate, on map expression data.

Also, a tenth aspect of the present invention is directed to an information system including the information processing apparatus according to any one of the first to ninth aspects, and one or more terminal apparatuses, wherein each of the terminal apparatuses includes: a terminal accepting unit that accepts a request instruction having specifying information; a terminal transmitting unit that transmits the request instruction to the information processing apparatus; a terminal receiving unit that receives map user information from the information processing apparatus, in response to transmission of the request instruction; a terminal processing unit that configures position added map expression data in which a position specified with the position specifying information contained in the map user information is shown on the map expression data contained in the map user information; and a terminal output unit that outputs the position added map expression data.

With this configuration, it is possible to show a position of another user, on map expression data.

Advantageous Effects of Invention

With the information processing apparatus according to the present invention, it is possible to show a position of another user, on map expression data.

BRIEF DESCRIPTION OF DRAWINGS

FIG. 10 shows a map expression data management table in this embodiment.

FIG. 11 shows a user information management table in this embodiment.

FIG. 12 shows a place name/position correspondence table in this embodiment.

DESCRIPTION OF EMBODIMENT

Figure 1:
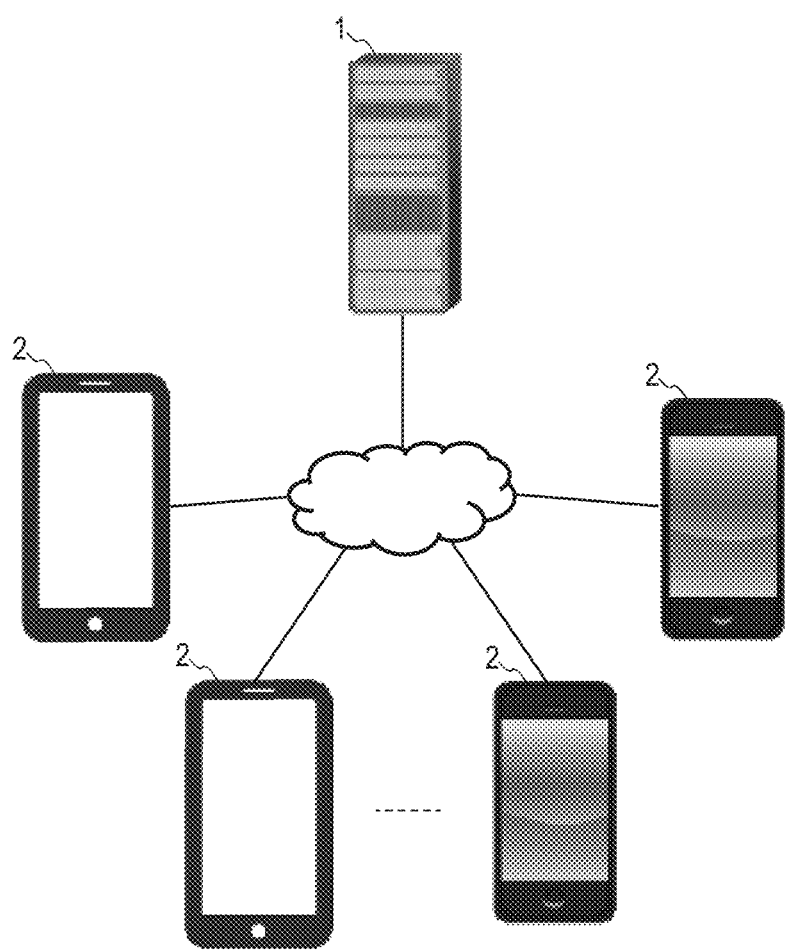
FIG. 1 is a conceptual diagram of an information system A in Embodiment 1.

Hereinafter, an embodiment of an information processing apparatus and the like will be described with reference to the drawings. It should be noted that constituent elements denoted by the same reference numerals in the embodiments perform similar operations, and thus a description thereof may not be repeated.

Embodiment 1

In this embodiment, an information system having an information processing apparatus will be described in which map expression data and users are associated with each other, and a position of another user is distributed together with map expression data to a user.

Furthermore, in this embodiment, a case will be described in which position specifying information for specifying a position of a user satisfying a predetermined condition is associated with map expression data. The position specifying information satisfying a predetermined condition is, for example, position specifying information of a terminal apparatus in a state of satisfying a predetermined condition. The position specifying information satisfying a predetermined condition is, for example, position specifying information of a terminal apparatus of a registrant, or the like.

Furthermore, in this embodiment, an information system for searching for map expression data with which region specifying information for specifying a region is associated, using position specifying information for specifying a position will be described.

Furthermore, in this embodiment, an information system sorting and outputting multiple pieces of map expression data that have been searched for and acquired and the like will be described.

FIG. 1 is a conceptual diagram of an information system A in this embodiment. The information system A includes an information processing apparatus 1 and one or at least two terminal apparatuses 2. The information processing apparatus 1 is a so-called server apparatus, such as a cloud server or an ASP server, and there is no limitation on the type thereof. Each terminal apparatus 2 is a terminal that is used by a user, such as a so-called smartphone, tablet device, laptop, or PC, and there is no limitation on the type thereof.

Figure 2:
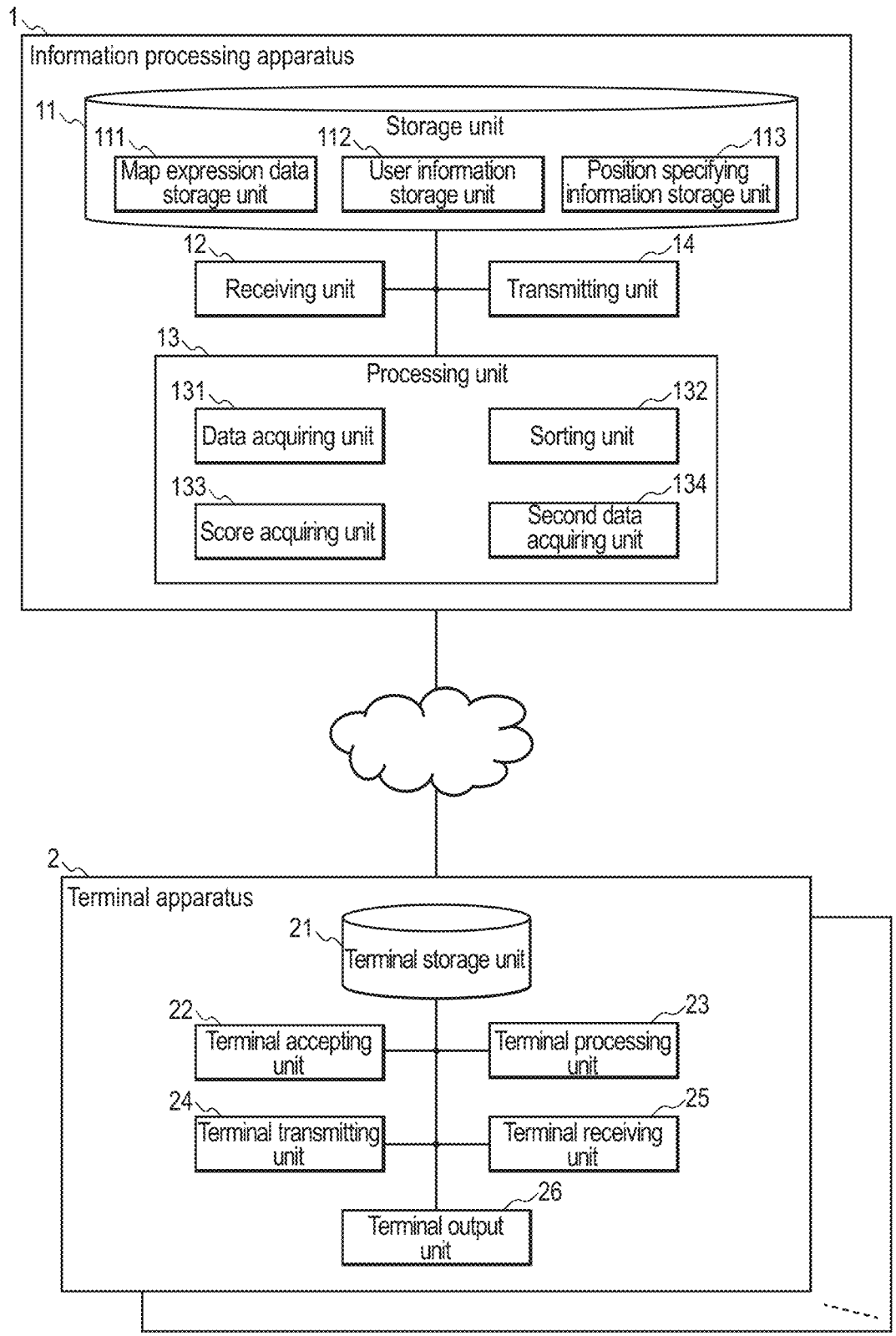
FIG. 2 is a block diagram of the information system A in this embodiment.

FIG. 2 is a block diagram of the information system A in this embodiment.

The information processing apparatus 1 constituting the information system A includes a storage unit 11, a receiving unit 12, a processing unit 13, and a transmitting unit 14.

The storage unit 11 includes a map expression data storage unit 111, a user information storage unit 112, and a position specifying information storage unit 113.

The receiving unit 12 includes a user position information receiving unit 121, and a request instruction receiving unit 122.

The processing unit 13 includes a data acquiring unit 131, a sorting unit 132, a score acquiring unit 133, and a second data acquiring unit 134.

The terminal apparatus 2 includes a terminal storage unit 21, a terminal accepting unit 22, a terminal processing unit 23, a terminal transmitting unit 24, a terminal receiving unit 25, and a terminal output unit 26.

In the storage unit 11 constituting the information processing apparatus 1, various types of information are stored. The various types of information are, for example, later-described map expression data, later-described user information, later-described position specifying information, or information consisting of a pair of place name information and position information. The place name information is information indicating a place name, and is, for example, a name of a place, a name of a point, a name of a scenic spot, a name of a station, a name of a landscape, a name of a prefecture, a name of a city, a name of a sightseeing attraction, or the like. The position information is information indicating a position, typical examples of which include (latitude, longitude), and is any information as long as it is information indicating a position.

Furthermore, the various types of information are, for example, an operation expression for calculating a later-described score, or a score table for acquiring a score. The operation expression is, for example, an expression using, as parameters, one or more attribute values of map expression data, and specific examples thereof include will be described later. The score table is a table in which a score or base data based on which a score is obtained is stored so as to be paired with each of one or more attribute values or a combination of attribute values of map expression data.

Furthermore, the various types of information are, for example, a place name/position correspondence table. The place name/position correspondence table is a table indicating correspondence between place name information and position information.

In the map expression data storage unit 111, two or more pieces of map expression data are stored. The map expression data is data expressing a map. The map expression data is information in which a geographical region expressed is limited. The map expression data is preferably associated with a map identifier for identifying map expression data. The map identifier is, for example, an ID, a name of a file containing map expression data, a name of map expression data, or the like. The map expression data is, for example, an old map, an illustrated map, a sketch map, a hand-written map, or the like, but there is no limitation on the type thereof. The map expression data is typically image data, but may also be vector data or the like, and there is no limitation on the data structure thereof. The map expression data is associated with one or at least two attribute values. The one or more attribute values are attribute values of map expression data. The attribute values are information indicating properties or features of map expression data, or the like. The one or more attribute values associated with the map expression data contain region specifying information. The region specifying information is information for specifying a region represented by the map expression data. The region is typically in the shape of a rectangle, but may be in the shape other than a rectangle, such as a triangle, an octagon, a circle, or the like. The region represented by map expression data may also be said to be a region expressed by map expression data. The region specifying information is, for example, a group of sets of (latitude, longitude). The region specifying information is, for example, a group of information of relative coordinate sets from a reference point. Note that there is no limitation on the data structure of the region specifying information, and the region specifying information may be any information as long as it is information for specifying a region.

The one or more attribute values associated with the map expression data are, for example, static attribute values, which are attribute values that are static. The one or more attribute values associated with the map expression data are, for example, dynamic attribute values that dynamically change. The one or more attribute values may include one or more static attribute values and one or more dynamic attribute values. The static attribute values are, for example, a scale factor of map expression data as a map (simply referred to as a "scale factor" as appropriate), an area of implementation of a region indicated by map expression data, on a map (simply referred to as an "area" as appropriate), or content information indicating the content of a map. The content information is a completion level of map expression data, a theme of map expression data, metadata or a keyword corresponding to map expression data, or the like. The metadata or keyword is, for example, the type of map expression data, a name or a landscape or place that is in a region in map expression data, or the like. The type of map expression data is, for example, "theme park" indicating that it is a map of a theme park, "sightseeing map" indicating that it is a map for sightseeing, information indicating that it is a map of a specific region (e.g., a school, etc.), or the like. The one or more static attribute values may be, for example, a flag indicating that a position specified with the position specifying information is to be shown, a flag indicating that a position specified with the position specifying information is not allowed to be shown, or the like. The dynamic attribute values are, for example, a distance between position indicated by position specifying information and a representative point of map expression data, or user action information regarding an action of a user to map expression data.

The representative point of map expression data is, for example, a center of gravity of map expression data, any point at an end of map expression data, or any point constituting a boundary of a region in map expression data.

It is preferable that the map expression data is contained in a file. Note that the map expression data may also be data in a database, and there is no limitation on the data format, and management method. If the map expression data is contained in a file, two or more pieces of map expression data may be contained in the file. It is also possible that one piece of map expression data is realized by two or more files. That is to say, it is also possible that one piece of map expression data is divided into two or more files.

The user action information typically contains one or more types of information out of history information and current information. The history information is information based on an operation of a user on map expression data from the past to the present. The current information is information based on a current operation of a user on map expression data. The history information is, for example, the number of downloads by users in the past, one or more user identifiers of users who downloaded data, the number of views per month, an average access time, the number of stars, an average of evaluation values from users such as a rank, or the number of comments from users to map expression data (the number of feedbacks). Note that the history information may also be, for example, an instruction from a user (e.g., a download instruction, or an instruction that is not displayed on the terminal apparatus 2), a received comment, a received evaluation value, or the like.

The current information is, for example, that is currently being output by the terminal apparatus 2, a map identifier for identifying map expression data, or an output time period (which may also be said to be a browsing time) of map expression data that is currently being output. The current information is, for example, user identifiers of one or more users who are currently browsing data.

In the user information storage unit 112, one or at least two pieces of user information are stored. The user information is information regarding a user. The user information typically has a user identifier for identifying a user. The user information has, for example, a user identifier and history information. The history information is information regarding a history of an operation of the user on map expression data. The history information is, for example, a map identifier for identifying map expression data browsed or downloaded, a time period during which map expression data is browsed, or the like. The user information may have current information. The current information is, for example, a map identifier of map expression data that is currently being browsed. The user information may have, for example, a flag indicating whether or not transmission of position specifying information for specifying a position of the user is permitted. Note that the user identifier may also be a terminal identifier for identifying the terminal apparatus 2. The user identifier is, for example, an ID, an e-mail address, a telephone number, a MAC address, or the like.

In the position specifying information storage unit 113, one or more pieces of position specifying information are stored in association with each of the two or more pieces of map expression data.

The position specifying information is information for specifying a position. The position specifying information may be considered as information for specifying a position of a user, or information for specifying a position of the terminal apparatus 2. The position specifying information is, for example, current position information indicating a current position at which the terminal apparatus 2 is located (e.g., information of (latitude, longitude)).

Note that the position specifying information may also be information for specifying a position of a region or an area that seems to be currently being focused on by a user, or the like. In this case, the position specifying information is position information corresponding map expression data or a map that is being output by the terminal apparatus 2, position information specified with place name information accepted by the terminal apparatus 2, map expression data or a map that is being output by the terminal apparatus 2, or place name information accepted by the terminal apparatus 2. The position information corresponding map expression data or a map that is being output by the terminal apparatus 2 is information indicating a position of a center of map expression data or a map that is being output by the terminal apparatus 2, information indicating a position of any one point on a boundary line of map expression data or a map that is being output by the terminal apparatus 2, or the like.

It is preferable that, in the position specifying information storage unit 113, position specifying information of one or more users satisfying a predetermined condition is stored in association with each of the two or more pieces of map expression data.

In this case, the position specifying information satisfying a predetermined condition is, for example, position specifying information indicating a position of the terminal apparatus 2 corresponding to the map expression data associated therewith. The terminal apparatus 2 corresponding to the map expression data is, for example, the terminal apparatus 2 in a state of satisfying a predetermined condition for the map expression data. The terminal apparatus 2 in a state of satisfying a predetermined condition is, for example, the terminal apparatus 2 that is outputting the map expression data, the terminal apparatus 2 that has downloaded the map expression data, the terminal apparatus 2 in which the map expression data is stored (typically, the terminal apparatus 2 has downloaded the map expression data and has not deleted the data), the terminal apparatus 2 on which a predetermined operation has been performed on the map expression data (e.g., the map expression data has been favorited, etc.).

Furthermore, the terminal apparatus 2 corresponding to the map expression data is, for example, the terminal apparatus 2 of a user who has been registered for the map expression data.

The receiving unit 12 receives various types of information, instructions, and the like from the terminal apparatus 2. The various types of information, instructions, and the like are, for example, a later-described request instruction, later-described user position information, position specifying information, or the like.

The user position information receiving unit 121 receives user position information having position specifying information and a user identifier.

The request instruction receiving unit 122 receives a request instruction from the terminal apparatus 2. The request instruction is an instruction to transmit map expression data. The request instruction contains specifying information for specifying map expression data. The specifying information is, for example, a map identifier, position specifying information, a user identifier, or the like. If the specifying information is a map identifier, for example, map expression data identified with the map identifier may be selected, or map expression data satisfying a condition (e.g., a later-described cache condition) predetermined for map expression data identified with the map identifier may be selected. If the specifying information is position specifying information, map expression data corresponding to a position specified with the position specifying information is selected. If the specifying information is a user identifier, map expression data paired with the user identifier is selected.

The processing unit 13 performs various types of processing. The various types of processing are, for example, processes that are performed by the data acquiring unit 131, the sorting unit 132, the score acquiring unit 133, or the second data acquiring unit 134.

The processing unit 13 configures position added map expression data in which a position specified with the position specifying information contained in the map user information is shown on the map expression data contained in the map user information, from the map user information acquired by the data acquiring unit 131. The process that configures position added map expression data is a known technique. That is to say, for example, the processing unit 13 acquires relative coordinate values (X, Y) of a position specified with the position specifying information, in a region specified with the region specifying information corresponding to the map expression data. Then, for example, the processing unit 13 arranges a pattern (e.g., an asterisk, a black circle, etc.) corresponding to the position specifying information, at a point indicated by the relative coordinate values (X, Y) in the map expression data. If there are two or more pieces of position specifying information, two or more patterns are arranged on the map expression data.

The processing unit 13 accumulates, for example, position specifying information contained in the received user position information, in the storage unit 11, in association with the user identifier contained in the user position information. With this processing, position specifying information for specifying a current position of the user or the terminal apparatus 2 is accumulated in association with the user identifier.

For example, the processing unit 13 configures user information that is to be registered, from the received user registration information, and accumulates it in the user information storage unit 112. If the user registration information is received, for example, the processing unit 13 generates a unique user identifier, configures user information from the user identifier and information (e.g., full name, age, sex, one or more map identifiers, etc.) contained in the user registration information, and accumulates it in the user information storage unit 112. This processing is user registering processing.

The data acquiring unit 131 acquires map user information having map expression data specified with the specifying information contained in the request instruction, and one or more pieces of position specifying information associated with the map expression data. That is to say, the data acquiring unit 131 acquires one or more pieces of map expression data specified with the specifying information contained in the received request instruction, from the map expression data storage unit 111. The data acquiring unit 131 acquires one or more pieces of position specifying information associated with the one or more pieces of acquired map expression data, from the position specifying information storage unit 113. Then, the data acquiring unit 131 configures one or more pieces of map user information having the map expression data and the one or more pieces of position specifying information associated with the map expression data.

In this case, when acquiring one or more pieces of position specifying information, the data acquiring unit 131 may acquire only one or more pieces of position specifying information satisfying a predetermined condition. The one or more pieces of position specifying information satisfying a predetermined condition are, for example, position specifying information corresponding to a user identifier that is paired with a flag indicating that transmission of position specifying information for specifying a position of the user is permitted. The one or more pieces of position specifying information satisfying a predetermined condition are, for example, position specifying information corresponding to a user identifier that is not paired with a flag indicating that transmission of position specifying information for specifying a position of the user is prohibited. The one or more pieces of position specifying information satisfying a predetermined condition are, for example, position specifying information for specifying a position of the terminal apparatus 2 in a state of satisfying a predetermined condition for the map expression data. The state of satisfying a predetermined condition is, for example, a state in which the map expression data is being output, a state in which the map expression data has been downloaded, or the like.

Also, a configuration may also be employed in which the data acquiring unit 131 acquires map user information having map expression data and one or more pieces of position specifying information, in a case in which a predetermined condition is satisfied, and acquires map expression data not having one or more pieces of position specifying information, in a case in which the predetermined condition is not satisfied. The predetermined condition is, for example, that a flag indicating that a position specified with the position specifying information is to be shown is associated with the map expression data in the map expression data storage unit 111. The predetermined condition is, for example, that one or more attribute values associated with the map expression data in the map expression data storage unit 111 satisfy a predetermined condition. The state in which one or more attribute values satisfy a predetermined condition is, for example, a state in which the type of map expression data is a specific type (e.g., "theme park") or is not a specific type, a state in which the area of a region indicated by the region specifying information is smaller than or equal to a threshold value or is smaller than a threshold value, a state in which the scale factor is greater than or equal to a threshold value or is greater than a threshold value, or the like.

Hereinafter, the processing of the data acquiring unit 131 in each of the cases in which the specifying information contained in the request instruction is a map identifier, position specifying information, and a user identifier will be described.

(1) Case in which Specifying Information is Map Identifier

The data acquiring unit 131 acquires a map identifier from specifying information contained in the request instruction. Then, the data acquiring unit 131 acquires map expression data identified with the map identifier, from the map expression data storage unit 111. In this case, the data acquiring unit 131 may acquire one or more attribute values of map expression data identified with the map identifier, and acquire one or more pieces of map expression data paired with one or more attribute values having a predetermined relationship with the one or more attribute values, from the map expression data storage unit 111. The predetermined relationship is that the values match each other, or have a similarity that is greater than or equal to a threshold value, for example. The process that acquires a similarity between groups of one or more attribute values is, for example, a process that acquires a similarity between vectors constituted by one or more attribute values, and is a known technique. The predetermined relationship is, for example, map expression data paired with region specifying information of a region that is the same as the region indicated by the region specifying information corresponding to the map expression data identified with the map identifier, or map expression data paired with region specifying information of a region that overlaps, over an area that is greater than or equal to a threshold value or is greater than a threshold value, the region indicated by the region specifying information corresponding to the map expression data identified with the map identifier, or the like.

Furthermore, the data acquiring unit 131 acquires one or more pieces of position specifying information associated with the one or more pieces of acquired map expression data, from the position specifying information storage unit 113. In this case, the data acquiring unit 131 may acquire only position specifying information satisfying a predetermined condition, out of the one or more pieces of position specifying information associated with the map expression data. Examples of the predetermined condition are as described above.

Then, the data acquiring unit 131 configures one or more pieces of map user information having the acquired map expression data and the acquired one or more pieces of position specifying information.

(2) Case in which Specifying Information is Position Specifying Information

The data acquiring unit 131 acquires one or at least two pieces of map expression data associated with region specifying information corresponding to a position specified with the position specifying information contained in a request instruction, from the map expression data storage unit 111. The region specifying information corresponding to a position specified with the position specifying information is, for example, region specifying information indicating a region containing a position specified with the position specifying information, region specifying information indicating a region containing a position that is close to a position specified with the position specifying information enough to satisfy a predetermined condition, or the like. In this case, for example, the one or more attribute values associated with the map expression data contain region specifying information.

If the map expression data is contained in a file, the data acquiring unit 131 acquires one or more files containing map expression data associated with region specifying information corresponding to a position specified with the position specifying information, from the map expression data storage unit 111. Note that the state in which the map expression data is contained in a file may also be a state in which the map expression data is a file. The state in which the map expression data is a file is, for example, a state in which the file is an image file of the map expression data.

Furthermore, the data acquiring unit 131 acquires one or more pieces of position specifying information associated with the one or more pieces of acquired map expression data, from the position specifying information storage unit 113. In this case, the data acquiring unit 131 may acquire only position specifying information satisfying a predetermined condition, out of the one or more pieces of position specifying information associated with the map expression data. Examples of the predetermined condition are as described above.

Then, the data acquiring unit 131 configures one or more pieces of map user information having the map expression data and the acquired one or more pieces of position specifying information.

(3) Case in which Specifying Information is User Identifier

The data acquiring unit 131 acquires a map identifier paired with a user identifier contained in a request instruction, from the user information storage unit 112. Then, the data acquiring unit 131 acquires one or more pieces of position specifying information associated with the map identifier, from the position specifying information storage unit 113. In this case, the data acquiring unit 131 may acquire only position specifying information satisfying a predetermined condition, out of the one or more pieces of position specifying information associated with the map expression data. Examples of the predetermined condition are as described above.

Then, the data acquiring unit 131 configures one or more pieces of map user information having the map expression data and the acquired one or more pieces of position specifying information. The map identifier paired with the user identifier is, for example, map identifier of map expression data purchased by the user, map identifier of map expression data downloaded by the user, a map identifier of map expression data that is being browsed by the user, or the like.

If there are two or more pieces of map expression data acquired by the data acquiring unit 131, the sorting unit 132 sorts the two or more pieces of map expression data, using one or more attribute values associated with each of the two or more pieces of map expression data. That is to say, if there are two or more pieces of map expression data acquired by the data acquiring unit 131, the sorting unit 132 acquires one or more attribute values associated with each of the two or more pieces of map expression data, from the map expression data storage unit 111, and sorts the two or more pieces of map expression data, using the one or more attribute values.

The sorting unit 132 sorts the two or more pieces of map expression data, for example, using a score as a key, the score being acquired from each of the one or more attribute values associated with the map expression data. Note that the score is acquired by a later-described score acquiring unit 133. The sorting is typically sorting in descending order of scores. The sorting unit 132 typically sorts map expression data such that data with a higher score is output first (earlier). The sorting may be any processing in which data is sequentially output by the terminal apparatus 2, and, for example, it may be re-ordering two or more pieces of map expression data, or adding order information indicating the order to two or more pieces of map expression data, in association with each piece of map expression data.

Note that the sorting of map expression data means the same as the sorting of map user information or the sorting of position added map expression data.

If there are two or more pieces of map expression data acquired by the data acquiring unit 131, the score acquiring unit 133 acquires a score of each of the two or more pieces of map expression data, using one or at least two attribute values associated with the map expression data. Various algorithms may be used to acquire scores. The score of map expression data may be considered to mean the same as a score of map user information or a score of position added map expression data.

The score acquiring unit 133 may acquire a score of each piece of map expression data, using only one or more attribute values associated with the map expression data. The score acquiring unit 133 may acquire a score of each piece of map expression data, using one or more attribute values associated with the map expression data, and user information.

The score acquiring unit 133 acquires, for example, a score of map expression data, using one or at least two attribute values out of a distance between position indicated by position specifying information and a representative point of map expression data (hereinafter, simply referred to as a "distance" as appropriate), a scale factor, an area, a completion level, metadata, the number of DLs, the number of views per month, an average access time, and an evaluation value. The scale factor is a scale factor of map expression data. The area is the actual area of a region in which map expression data is expressed. The completion level is information indicating the level at which map expression data is completed, and is information input by a person. The metadata is information that is given to map expression data. The number of DLs is the total number of times that data is downloaded to one or more terminal apparatuses 2 to the present, and displayed on the one or more terminal apparatuses 2. Note that the number of DLs may also be the total number of times that data is downloaded to one or more terminal apparatuses 2 to the present. The number of views per month is the total number of times that data is displayed on one or more terminal apparatuses 2 in that month or the previous month. The average access time is an average of time periods during which data is displayed on terminal apparatuses 2. The evaluation value is an average of evaluation values from users.

The score acquiring unit 133 calculates, for example, a score such that the smaller the distance is, the larger the score is. The score acquiring unit 133 calculates, for example, a score such that the smaller the scale factor is, the larger the score is. The score acquiring unit 133 calculates, for example, a score such that the smaller the area is, the larger the score is. The score acquiring unit 133 calculates, for example, a score such that the higher the completion level is (the larger the value of the completion level is), the larger the score is. The score acquiring unit 133 calculates, for example, a score such that the larger the number of DLs is, the larger the score is. The score acquiring unit 133 calculates, for example, a score such that the larger the number of views per month, the larger the score is. The score acquiring unit 133 calculates, for example, a score such that the longer the average access time is, the larger the score is. The score acquiring unit 133 calculates, for example, a score such that the larger the evaluation value is, the larger the score is.

The score acquiring unit 133 may, for example, refer to a score table in which the score is determined if one or at least two attribute values are determined, and acquire a score from the score table using the acquired one or at least two attribute values.

The score acquiring unit 133 may, for example, acquire a score, using the number of pieces of position specifying information contained in the map user information, the number of pieces of position specifying information corresponding to the position added map expression data, or the number of positions of other users or other terminal apparatuses 2 expressed on the map expression data contained in the map user information. In this case, it is preferable that the score acquiring unit 133 acquires a score of map user information or position added map expression data such that the larger the number of pieces of position specifying information or the number of positions is, the larger the score is.

After the receiving unit 12 receives position specifying information, the second data acquiring unit 134 acquires one or more pieces of map expression data satisfying a predetermined condition (hereinafter, referred to as a "cache condition" as appropriate). The second data acquiring unit 134 acquires map expression data for cache in order to increase the speed of map expression data display on the terminal apparatus 2. That is to say, it is preferable that the second data acquiring unit 134 acquires map expression data that is estimated to be highly likely to be requested next by a user of the terminal apparatus 2 (that satisfies a predetermined condition).

The second data acquiring unit 134 acquires, for example, one or more attribute values of map expression data that has been transmitted by the transmitting unit 14 to the terminal apparatus 2 (map expression data that is currently being browsed), and acquires one or more pieces of map expression data corresponding to an attribute value having a predetermined relationship with the one or more attribute values. Note that the attribute value having a predetermined relationship is, for example, one or more attribute values that match one or more attribute values of map expression data that is currently being browsed. The attribute value having a predetermined relationship is, for example, one or more attribute values that are close to one or more attribute values of map expression data that is currently being browsed enough to satisfy a predetermined condition. The having a predetermined relationship is an example of the cache condition.

The second data acquiring unit 134 acquires, for example, one or more pieces of map expression data, using history information paired with the user identifier received by the receiving unit 12. The second data acquiring unit 134 acquires, for example, s one or more attribute values paired with one or more map identifiers contained in history information, acquires attribute values satisfying a cache condition out of the acquire attribute values (acquires attribute values preferred by the user), and acquires one or more pieces of map expression data paired with the attribute values.

The second data acquiring unit 134 acquires, for example, one or more pieces of map expression data, using the one or more attribute values of map expression data that has been transmitted by the transmitting unit 14 to the terminal apparatus 2 (map expression data that is currently being browsed), and the history information paired with the user identifier received by the receiving unit 12.

The second data acquiring unit 134 acquires, for example, one or more pieces of map expression data in which the score acquired by the score acquiring unit 133 is large enough to satisfy a predetermined condition. Note that, in this case, the score acquiring unit 133 acquires a score of map expression data, using one or more types of attribute values out of the one or more attribute values of map expression data that has been transmitted by the transmitting unit 14 to the terminal apparatus 2 (map expression data that is currently being browsed) and the history information paired with the user identifier received by the receiving unit 12.

There is no limitation on the time at which the second data acquiring unit 134 acquires map expression data that is to be cached by one terminal apparatus 2. For example, in a case in which map expression data is transmitted to one terminal apparatus 2, the second data acquiring unit 134 may start a process that acquires map expression data that is to be cached by the one terminal apparatus 2. For example, in a case in which a predetermined time period has elapsed after map expression data is transmitted to one terminal apparatus 2, the second data acquiring unit 134 may start a process that acquires map expression data that is to be cached by the one terminal apparatus 2.

The transmitting unit 14 transmits the one or more pieces of map user information acquired by the data acquiring unit 131, or one or more pieces of position added map expression data in which a position specified with the position specifying information contained in each of the one or more pieces of map user information is shown on the map expression data, to the terminal apparatus 2. If the transmitting unit 14 transmits the position added map expression data to the terminal apparatus 2, the processing unit 13 configures position added map expression data in which a position specified with the position specifying information contained in the map user information is shown on the map expression data contained in the map user information, from the map user information acquired by the data acquiring unit 131.

The transmitting unit 14 may transmit the one or more pieces of map expression data acquired by the data acquiring unit 131, to the terminal apparatus 2.

If the transmitting unit 14 transmits one piece of map expression data or the like, the one piece of map expression data or the like may also be two or more files. The transmitting unit 14 may perform transmission to the terminal apparatus 2 such that multiple files constituting one piece of map expression data or the like (files each constituting part of the map expression data) are put together into one and transmitted in the form of a compressed file, or multiple files associated with one ID are transmitted at different times through asynchronous communication. Note that a file constituting part of one piece of map expression data or the like may also be said to be a tile image file. Also, multiple files constituting one piece of map expression data or the like may also be said to be a data set. The one piece of map expression data or the like is, for example, one piece of map expression data, one piece of map user information, or one piece of position added map expression data.

The transmitting unit 14 transmits, for example, the two or more pieces of map expression data sorted by the sorting unit 132, to the terminal apparatus 2. The transmitting unit 14 transmits, for example, the two or more pieces of map user information or the position added map expression data sorted by the sorting unit 132, to the terminal apparatus 2.

The transmitting unit 14 transmits, for example, part or all of the one or more pieces of map expression data or the like acquired by the second data acquiring unit 134, to the terminal apparatus 2. Part of the map expression data or the like is map expression data or the like in a partial region obtained by dividing the map expression data. The map expression data or the like in a partial region may also be said to be partial map expression data or the like. The map expression data or the like is, for example, map expression data, map user information, or position added map expression data.

The transmitting unit 14 transmits, for example, the one or more files acquired by the data acquiring unit 131, to the terminal apparatus 2. Note that, in this case, the files contain, for example, one or at least two pieces of map expression data. The files are, for example, one or at least two pieces of map user information, one or at least two pieces of position added map expression data, or the like.

The transmitting unit 14 transmits, for example, the map user information having the map expression data and the one or more pieces of position specifying information, or the position added map expression data, to the terminal apparatus 2, only in a case in which a predetermined condition is satisfied. In this case, the predetermined condition is, for example, that a flag indicating that a position specified with the position specifying information is to be shown is associated with the map expression data in the map expression data storage unit 111, that one or more attribute values associated with the map expression data in the map expression data storage unit 111 satisfy a predetermined condition, or the like. Examples of the predetermined condition are as described above.

In the terminal storage unit 21 constituting the terminal apparatus 2, various types of information are stored. The various types of information are, for example, a user identifier, a map identifier of map expression data or the like that has been output, or the whole or part of map expression data that has been cached. The various types of information are, for example, place name/position correspondence table.

The terminal accepting unit 22 accepts various types of instructions or information. The various types of instructions or information are, for example, a request instruction having specifying information, or various operations. The request instruction may or may not have a map identifier.

In this example, the accepting is a concept that encompasses accepting information input from an input device such as a keyboard, a mouse, or a touch panel, receiving information transmitted via a wired or wireless communication line, accepting information read from a storage medium such as an optical disk, a magnetic disk, or a semiconductor memory, and the like.

The various types of instructions or information may be input by any part such as a touch panel, a keyboard, a mouse, a menu screen, or the like. The terminal accepting unit 22 may be realized by a device driver for an input part such as a touch panel or a keyboard, software for controlling a menu screen, or the like.

The terminal processing unit 23 performs various types of processing. The various types of processing are, for example, a process that configures position added map expression data, from the received map user information. the terminal processing unit 23 configures, for example, position added map expression data in which a position specified with the position specifying information contained in the received map user information is shown on the map expression data contained in the map user information. The terminal processing unit 23 may configure position added map expression data, using only the position specifying information satisfying a predetermined condition, out of the one or more pieces of position specifying information contained in the map user information.

Furthermore, the various types of processing are, for example, a process that configures a request instruction that is to be transmitted, from the request instruction accepted by the terminal accepting unit 22. If the terminal accepting unit 22 accepts a request instruction, and the request instruction does not have a map identifier, for example, the terminal processing unit 23 acquires position information indicating the current position, acquires a user identifier from the terminal storage unit 21, and configures a request instruction having position specifying information having the position information and the user identifier. If the terminal accepting unit 22 accepts a request instruction, the request instruction does not have a map identifier, and a map or map expression data is displayed on the terminal apparatus 2, for example, the terminal processing unit 23 acquires position information of a representative point of a region in the displayed map or position information of a representative point of a region in the displayed map expression data, acquires a user identifier from the terminal storage unit 21, and configures a request instruction having position specifying information having the position information and the user identifier. If the terminal accepting unit 22 accepts a request instruction, the request instruction does not have a map identifier, and a map or map expression data is displayed on the terminal apparatus 2, for example, the terminal processing unit 23 acquires the displayed map or the displayed map expression data, acquires a user identifier from the terminal storage unit 21, and configures a request instruction having the map or map expression data and the user identifier. If the terminal accepting unit 22 accepts a request instruction, and the request instruction has point information, for example, the terminal processing unit 23 acquires a user identifier from the terminal storage unit 21, and configures a request instruction having position specifying information having the point information and the user identifier. If the terminal accepting unit 22 accepts a request instruction, and the request instruction has point information, for example, the terminal processing unit 23 acquires a user identifier from the terminal storage unit 21, acquires position information corresponding the point information from the place name/position correspondence table in the terminal storage unit 21, and configures a request instruction having position specifying information having the position information and the user identifier.

The various types of processing are, for example, a process that acquires position information paired with the accepted place name information from the place name/position correspondence table in the terminal storage unit 21.

The various types of processing are, for example, a process that temporarily stores the whole or part of the map expression data received for cache, in an unshown buffer.

The terminal transmitting unit 24 transmits various types of instructions or information to the information processing apparatus 1. The terminal transmitting unit 24 transmits the information configured by the terminal processing unit 23, to the information processing apparatus 1. The terminal transmitting unit 24 transmits, for example, a request instruction to the information processing apparatus 1.

The terminal receiving unit 25 receives various types of information from the information processing apparatus 1. The various types of information are, for example, map expression data, map user information, or position added map expression data. The various types of information are the whole or part of map expression data for cache, or the like.

The terminal receiving unit 25 receives, for example, one or at least two pieces of map user information from the information processing apparatus 1, in response to transmission of the request instruction. The terminal receiving unit 25 receives, for example, one or at least two pieces of position added map expression data or one or at least two pieces of map expression data, from the information processing apparatus 1, in response to transmission of the request instruction.

The terminal output unit 26 outputs various types of information. The various types of information are information accepted by the terminal accepting unit 22, map expression data received by the terminal receiving unit 25, or the like. The various types of information are, for example, position added map expression data. The terminal output unit 26 may output the position added map expression data in which only position specifying information satisfying a predetermined condition is shown, out of the one or more pieces of position specifying information contained in the position added map expression data.

In this example, the output is typically display on a display screen. Note that the output may be considered as a concept that encompasses projection using a projector, printing by a printer, transmission to an external apparatus (typically, a display apparatus), delivery of a processing result to another processing apparatus or another program, and the like.

The storage unit 11, the map expression data storage unit 111, the user information storage unit 112, the position specifying information storage unit 113, and the terminal storage unit 21 are preferably non-volatile storage media, but can also be realized by volatile storage media.

There is no limitation on the procedure in which information is stored in the storage unit 11 and the like. For example, information may be stored in the storage unit 11 and the like via a storage medium, information transmitted via a communication line or the like may be stored in the storage unit 11 and the like, or information input via an input device may be stored in the storage unit 11 and the like.

The receiving unit 12, the user position information receiving unit 121, the request instruction receiving unit 122, and the terminal receiving unit 25 5 are typically realized by a wireless or wired communication part, but can also be realized by a broadcast receiving part.

The processing unit 13, the data acquiring unit 131, the sorting unit 132, the score acquiring unit 133, the second data acquiring unit 134, and the terminal processing unit 23 may be realized typically by MPUs, memories, or the like. Typically, the processing procedure of the processing unit 13 and the like is realized by software, and the software is stored in a storage medium such as a ROM. Note that the processing procedure may be realized also by hardware (dedicated circuits).

The transmitting unit 14 and the terminal transmitting unit 24 are typically realized by a wireless or wired communication part, but can also be realized by a broadcasting part.

The terminal output unit 26 may be considered to include or to not include an output device such as a display screen or a speaker. The terminal output unit 26 may be realized by driver software for an output device, a combination of driver software for an output device and the output device, or the like.

Next, an operation of the information system A will be described. First, an operation of the information processing apparatus 1 will be described with reference to the flowcharts in FIGS. 3 to 8.

(Step S301) The receiving unit 12 judges whether or not it has received a request instruction from the terminal apparatus 2. If it has received a request instruction, the procedure advances to step S302, and, if otherwise, the procedure advances to step S306.

(Step S302) The data acquiring unit 131 acquires one or more pieces of map expression data corresponding to the request instruction received in step S301. Note that the map expression data acquiring processing will be described with reference to the flowchart in FIG. 5.

(Step S303) The data acquiring unit 131 acquires one or more pieces of map user information, using the map expression data acquired in step S302. Note that the map user information acquiring processing will be described with reference to the flowchart in FIG. 8.

(Step S304) The transmitting unit 14 transmits the one or more pieces of map user information acquired in step S303, or one or more pieces of position added map expression data in which a position specified with the position specifying information contained in each of the one or more pieces of map user information acquired in step S303 is shown on the map expression data, to the terminal apparatus 2 from which the request instruction was transmitted.

(Step S305) The processing unit 13 changes state information paired with the user identifier corresponding to the terminal apparatus 2 from which the request instruction was transmitted, according to transmission of the map user information or the like in step S304. The procedure returns to step S301. This state information is that the state is set to a state in which map expression data corresponding to the transmitted map user information or position added map expression data is output, in which map expression data corresponding to the transmitted map user information or position added map expression data is accumulated, or the like. The state information is an example of an attribute value that is paired with a user identifier. The state information is, for example, history information, or current information.

(Step S306) The user position information receiving unit 121 judges whether or not it has received user position information having position specifying information and a user identifier. If it has received user position information, the procedure advances to step S307, and, if otherwise, the procedure advances to step S308.

(Step S307) The processing unit 13 accumulates the position specifying information contained in the user position information received in step S306, in the storage unit 11, in association with the user identifier contained in the user position information. The procedure returns to step S301. The accumulated position specifying information is typically associated with one or more pieces of map expression data by means of a user identifier.

(Step S308) The receiving unit 12 judges whether or not it has received user registration information. If it has received user registration information, the procedure advances to step S309, and, if otherwise, the procedure advances to step S311.

(Step S309) The processing unit 13 acquires user information that is to be registered, from the user registration information received in step S308.

(Step S310) The processing unit 13 configures user information that is to be registered, from the user information acquired in step S309, and accumulates it in the user information storage unit 112. The procedure returns to step S301.

(Step S311) The second data acquiring unit 134 judges whether or not to transmit map expression data that is to be cached by one terminal apparatus 2. If it is judged to transmit map expression data for cache, the procedure advances to step S312, and, if otherwise, the procedure advances to step S322. The case in which it is judged to transmit map expression data for cache is, for example, a case in which map expression data is transmitted to one terminal apparatus 2, or a case in which a predetermined period of time has elapsed after map expression data is transmitted to one terminal apparatus 2.

(Step S312) The second data acquiring unit 134 acquires history information paired with the user identifier of the terminal apparatus 2 to which map expression data for cache is to be transmitted, from the user information storage unit 112.

(Step S313) The second data acquiring unit 134 substitutes 1 for a counter j.

(Step S314) The second data acquiring unit 134 judges whether or not there is a $j^{-th}$ piece of map expression data in the map expression data storage unit 111. If there is a $j^{-th}$ piece of map expression data, the procedure advances to step S315, and, if otherwise, the procedure advances to step S319.

(Step S315) The second data acquiring unit 134 acquires one or more attribute values paired with the $j^{-th}$ piece of map expression data, from the map expression data storage unit 111.

(Step S316) The second data acquiring unit 134 judges whether or not the one or more attribute values acquired in step S315, the history information acquired in step S312, or the one or more attribute values acquired in step S315 and the history information acquired in step S312 match a cache condition. If the cache condition is matched, the procedure advances to step S317, and, if otherwise, the procedure advances to step S318. The second data acquiring unit 134 may use current information in order to judge whether or not the cache condition is matched.

(Step S317) The second data acquiring unit 134 temporarily stores a map identifier for identifying the $j^{-th}$ piece of map expression data, in an unshown buffer. Note that the score acquiring unit 133 may calculate a score as described above for the $j^{-th}$ piece of map expression data, and temporarily store the map identifier in an unshown buffer so as to be paired with the score. The map identifier that is temporarily stored in a buffer is typically an identifier of map expression data that is a candidate for map expression data that is to be cached. An example of a method for the score acquiring unit 133 to calculate a score is as described above.

(Step S318) The second data acquiring unit 134 increments the counter j by 1. The procedure returns to step S314.

(Step S319) The second data acquiring unit 134 decides on map expression data that is to be cached by the terminal apparatus 2, out of the map expression data identified with the map identifiers accumulated in the unshown buffer. Note that the second data acquiring unit 134 may decide on all pieces of map expression data identified with the map identifiers accumulated in the unshown buffer, as map expression data that is to be cached. The second data acquiring unit 134 may select one map identifier at random out of the map expression data identified with the map identifiers accumulated in the unshown buffer, and decide on all pieces of map expression data identified with the one map identifier, as map expression data that is to be cached. It is also possible that map expression data in which the score accumulated in the unshown buffer is in the top N (N is a natural number of 1 or more) is decided on as map expression data that is to be cached. It is also possible that map expression data in which the score accumulated in the unshown buffer is greater than or equal to a threshold is decided on as map expression data that is to be cached. Note that the deciding on map expression data may be, for example, providing a map identifier, giving a flag to map expression data, or the like.

(Step S320) The second data acquiring unit 134 acquires the one or more pieces of map expression data decided on step S319, from the map expression data storage unit 111. In this case, the second data acquiring unit 134 may acquire one or more pieces of position specifying information associated with the acquired map expression data, from the position specifying information storage unit 113, and configure map user information or position added map expression data using the map expression data and the one or more pieces of position specifying information.

(Step S321) The transmitting unit 14 transmits all of the one or more pieces of map expression data acquired in step S320 or part of each of the one or more pieces of map expression data acquired in step S320, to one terminal apparatus 2 judged as an apparatus that is to cache the data. The procedure returns to step S301. In this case, the data that is to be cached does not have to be map expression data, and may be map user information, position added map expression data, or part thereof.

(Step S322) The receiving unit 12 judges whether or not it has received other operation information or the like from the terminal apparatus 2. If it has received operation information or the like, the procedure advances to step S323, and, if otherwise, the procedure returns to step S301. Note that the operation information or the like is, for example, operation information and a user identifier.

(Step S323) The processing unit 13 accumulates the operation information or the like received in step S322, in the user information storage unit 112. The procedure returns to step S301. In this case, the processing unit 13 may perform processing according to the received operation information or the like.

Figure 3:
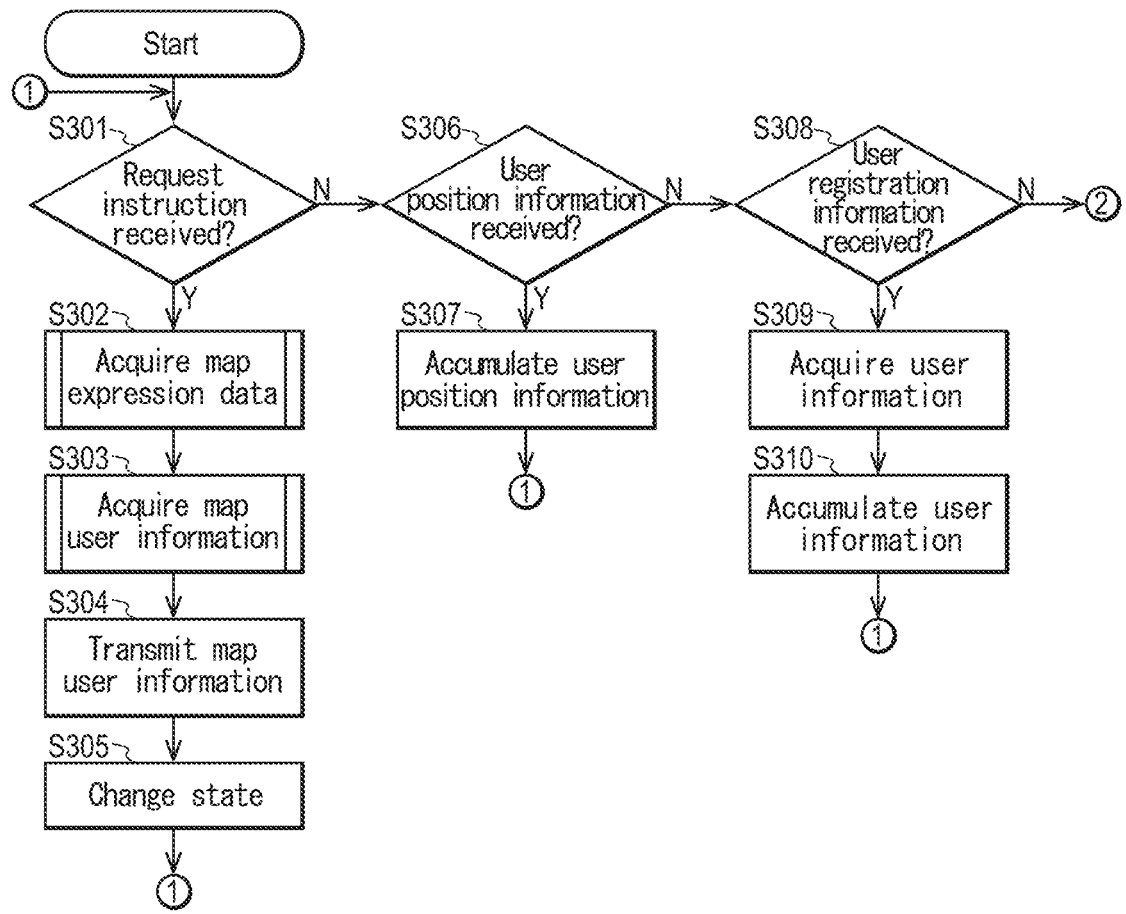
FIG. 3 is a flowchart illustrating an operation of an information processing apparatus 1 in this embodiment.
Figure 4:
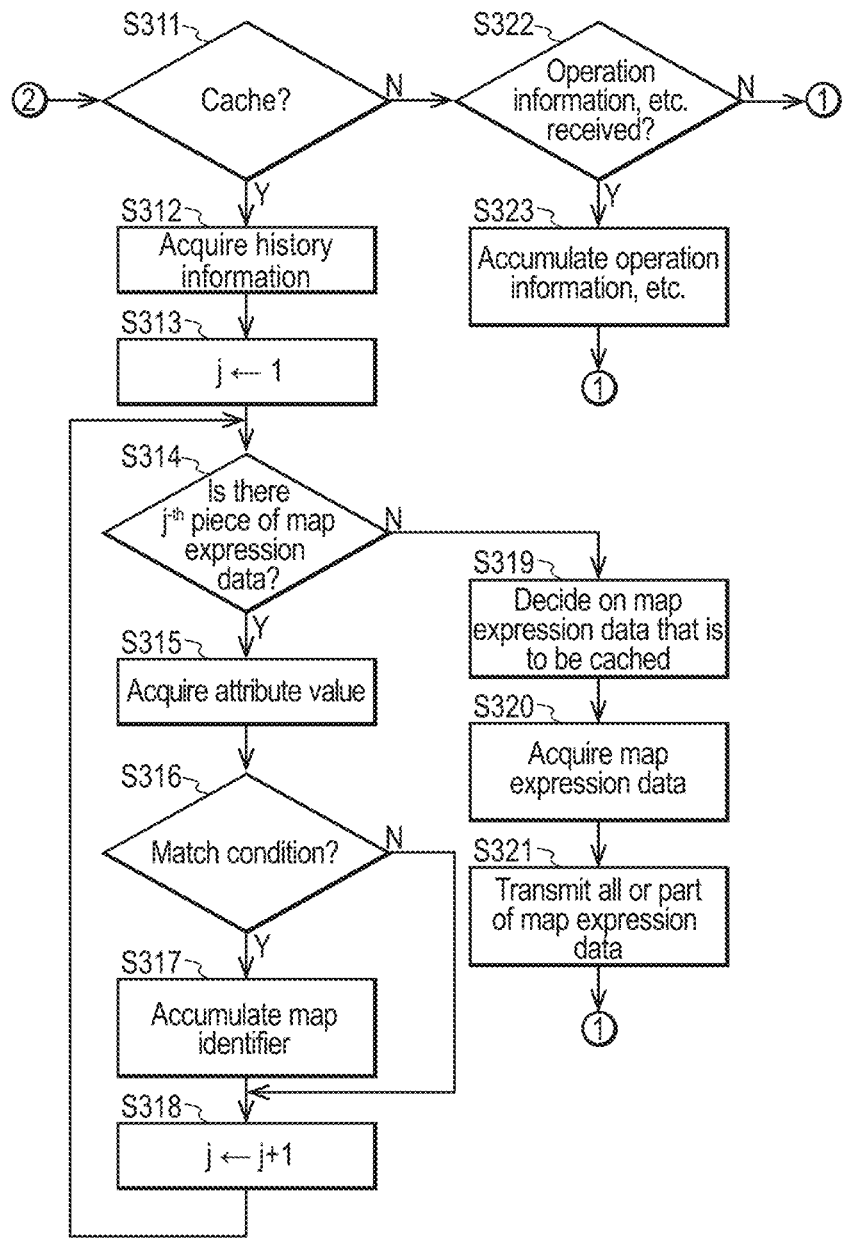
FIG. 4 is a flowchart illustrating an operation of the information processing apparatus 1 in this embodiment.

In the flowcharts in FIGS. 3 and 4, processing ends at power off or at an interruption of ending processing.

Figure 5:
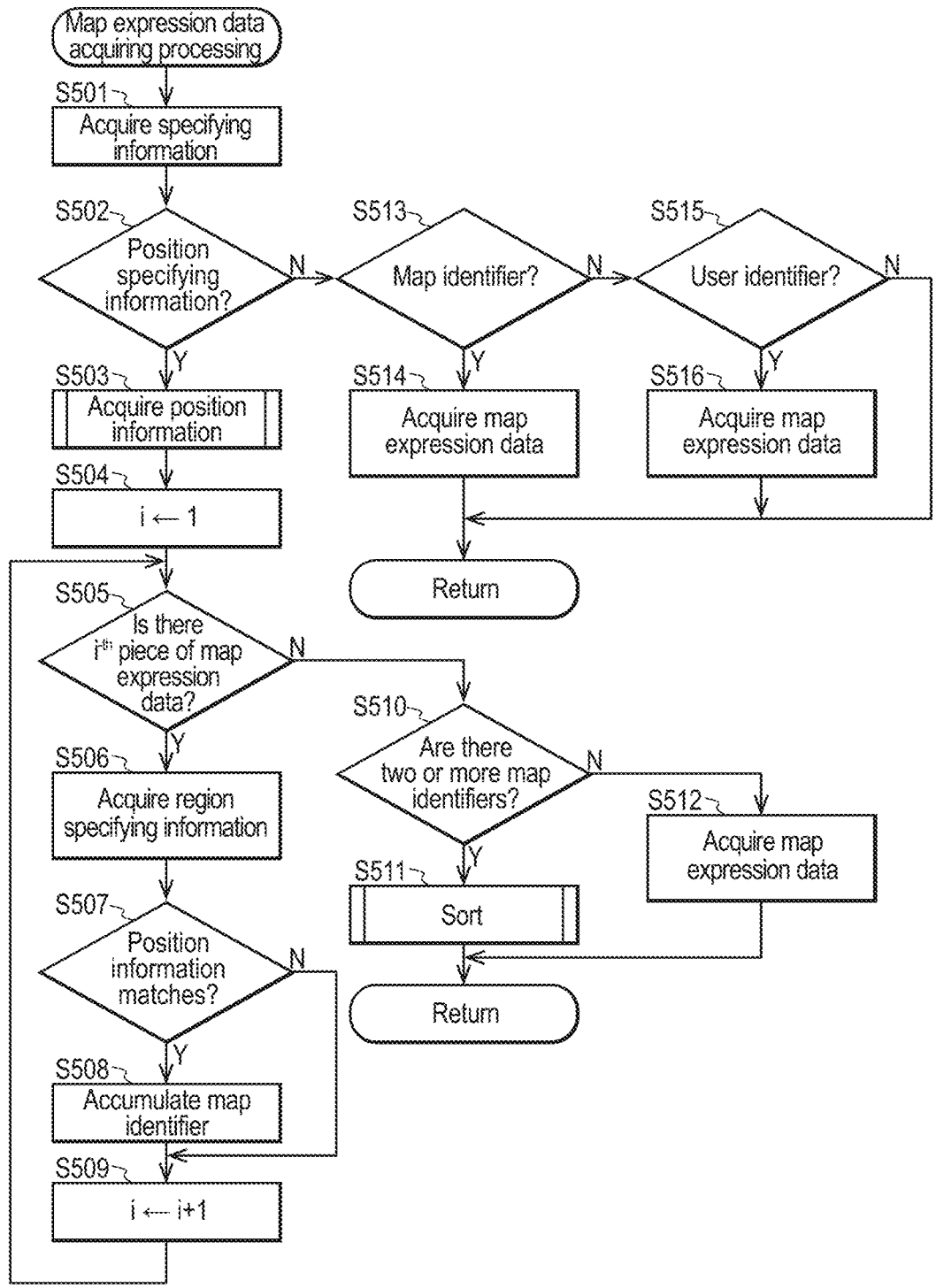
FIG. 5 is a flowchart illustrating map expression data acquiring processing in this embodiment.

Next, the map expression data acquiring processing in step S302 will be described with reference to the flowchart in FIG. 5.

(Step S501) The data acquiring unit 131 acquires specifying information contained in the received request instruction.

(Step S502) The data acquiring unit 131 judges whether or not the specifying information acquired in step S501 is position specifying information. If it is position specifying information, the procedure advances to step S503, and, if otherwise, the procedure advances to step S513.

(Step S503) The data acquiring unit 131 acquires position information, using the position specifying information acquired in step S501. Note that the position information acquiring processing will be described with reference to the flowchart in FIG. 6.

(Step S504) The data acquiring unit 131 substitutes 1 for a counter i.

(Step S505) The data acquiring unit 131 judges whether or not there is an $i^{-th}$ piece of map expression data in the map expression data storage unit 111. If there is an $i^{-th}$ piece of map expression data, the procedure advances to step S506, and, if otherwise, the procedure advances to step S510.

(Step S506) The data acquiring unit 131 acquires region specifying information paired with the $i^{-th}$ piece of map expression data, from the map expression data storage unit 111.

(Step S507) The data acquiring unit 131 judges whether or not the position information acquired in step S503 matches the region specifying information acquired in step S506. If the position information matches the region specifying information, the procedure advances to step S508, and, if otherwise, the procedure advances to step S509. Note that a state in which the position information matches the region specifying information is, for example, a state in which a point specified with the position information is contained in a region indicated by the region specifying information, a state in which a point specified with the position information is close to a region indicated by the region specifying information enough to satisfy a predetermined condition, or the like. Note that the position information acquired in step S503 is position information is stored in a later-described variable.

(Step S508) The data acquiring unit 131 acquires a map identifier for identifying the $i^{-th}$ piece of map expression data, from the map expression data storage unit 111, and temporarily stores it in an unshown buffer.

(Step S509) The data acquiring unit 131 increments the counter i by 1. The procedure returns to step S505.

(Step S510) The sorting unit 132 judges whether or not there are two or more map identifiers in an unshown buffer. If there are two or more map identifiers, the procedure advances to step S511, and, if otherwise, the procedure advances to step S512.

(Step S511) The sorting unit 132 sorts two or more pieces of map expression data identified with the two or more map identifiers in the unshown buffer. The procedure returns to the upper-level processing. Note that the sorting processing will be described with reference to the flowchart in FIG. 7.

(Step S512) The processing unit 13 acquires a map identifier in the unshown buffer, and acquires map expression data identified with the map identifier, from the map expression data storage unit 111. The procedure returns to the upper-level processing.

(Step S513) The data acquiring unit 131 judges whether or not the specifying information acquired in step S501 is a map identifier. If it is a map identifier, the procedure advances to step S514, and, if otherwise, the procedure advances to step S515.

(Step S514) The data acquiring unit 131 acquires, for example, map expression data identified with the map identifier acquired in step S501, from the map expression data storage unit 111. For example, the data acquiring unit 131 may acquire map expression data having a predetermined relationship with map expression data identified with the map identifier acquired in step S501, from the map expression data storage unit 111. The predetermined relationship is, for example, that one or more attribute values are the same or similar to each other. The state in which one or more attribute values are the same or similar to each other is, for example, that regions indicated by two pieces of region specifying information overlap each other over an area that is greater than or equal to a threshold value or is greater than a threshold value, that regions indicated by two pieces of region specifying information match each other, or the like.

(Step S515) The data acquiring unit 131 judges whether or not the specifying information acquired in step S501 is a user identifier. If it is a user identifier, the procedure advances to step S516, and, if otherwise, the procedure returns to the upper-level processing.

(Step S516) The data acquiring unit 131 acquires one or more pieces of map expression data paired with the user identifier acquired in step S501, from the map expression data storage unit 111. The procedure returns to the upper-level processing.

Figure 6:
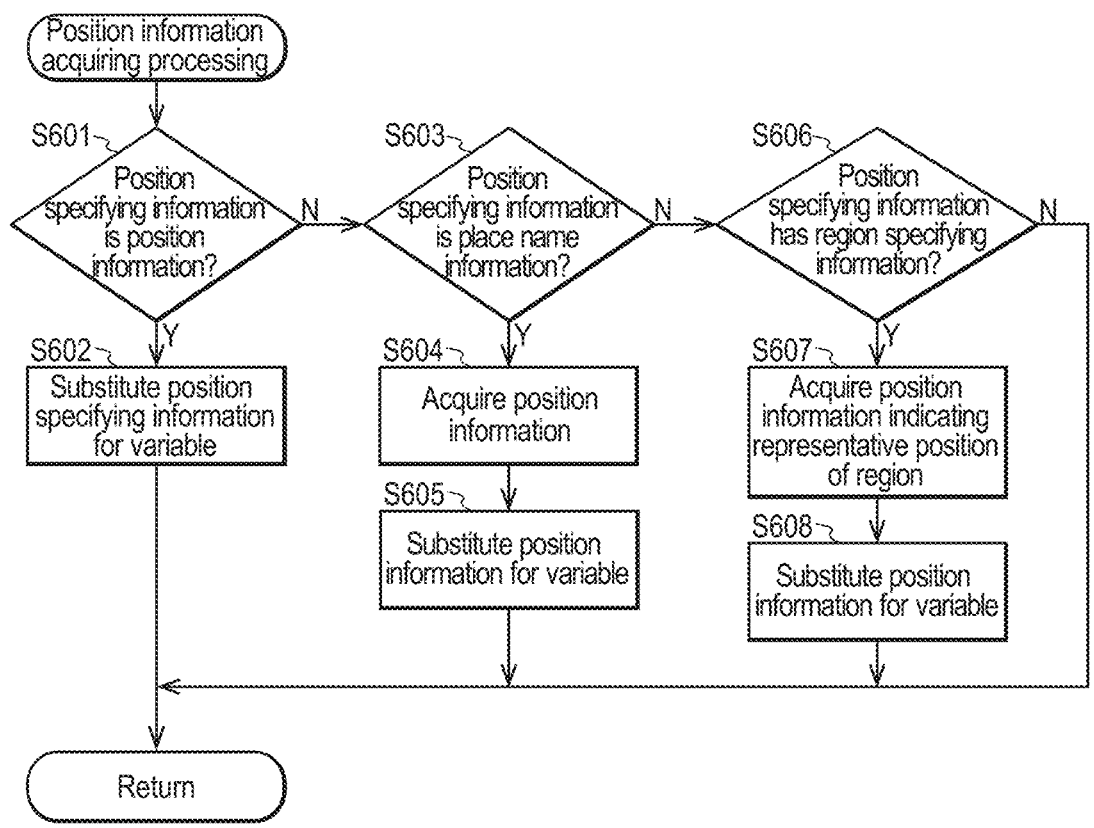
FIG. 6 is a flowchart illustrating position information acquiring processing in this embodiment.

Next, the position information acquiring processing in step S503 will be described with reference to the flowchart in FIG. 6.

(Step S601) The data acquiring unit 131 judges whether or not the acquired specifying information is position information itself. If it is position information itself, the procedure advances to step S602, and, if otherwise, the procedure advances to step S603.

(Step S602) The data acquiring unit 131 substitutes the position specifying information for a variable in which position information is stored. The procedure returns to the upper-level processing.

(Step S603) The data acquiring unit 131 judges whether or not the acquired position specifying information is place name information. If it is place name information, the procedure advances to step S604, and, if otherwise, the procedure advances to step S606.

(Step S604) The data acquiring unit 131 acquires position information corresponding to the acquired place name information, from the storage unit 11.

(Step S605) The data acquiring unit 131 substitutes the acquired position information for a variable in which position information is stored. The procedure returns to the upper-level processing.

(Step S606) The data acquiring unit 131 judges whether or not the acquired position specifying information has region specifying information indicating a region, or region specifying information corresponding to the acquired position specifying information (e.g., map expression data, a map, or a map identifier) is stored in the map expression data storage unit 111. If the information has region specifying information or the like, the procedure advances to step S607, and, if otherwise, the procedure returns to the upper-level processing.

(Step S607) The data acquiring unit 131 acquires position information indicating a representative position of a region indicated by the region specifying information contained in the acquired position specifying information, or acquires position information indicating a representative position of a region indicated by the region specifying information corresponding to the acquired position specifying information. Note that the position information indicating a representative position of a region is, for example, position information indicating the position of the center of gravity of the region.

(Step S608) The data acquiring unit 131 substitutes the position information acquired in step S607 for a variable in which position information is stored. The procedure returns to the upper-level processing.

Figure 7:
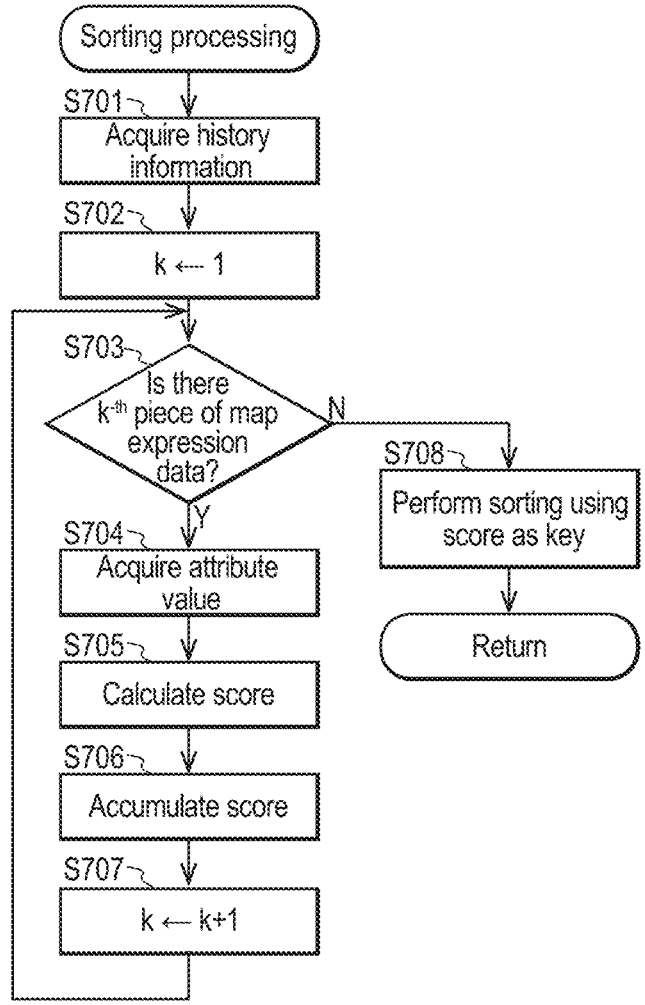
FIG. 7 is a flowchart illustrating sorting processing in this embodiment.

Next, the sorting processing in step S511 will be described with reference to the flowchart in FIG. 7.

(Step S701) The score acquiring unit 133 acquires history information paired with a user identifier of a user of the terminal apparatus 2 from which the request instruction was transmitted, from the user information storage unit 112.

(Step S702) The score acquiring unit 133 substitutes 1 for a counter k.

(Step S703) The score acquiring unit 133 judges whether or not there is a $k^{-th}$ map identifier in an unshown buffer. If there is a $k^{-th}$ map identifier, the procedure advances to step S704, and, if otherwise, the procedure advances to step S708. Note that the state in which there is a $k^{-th}$ map identifier is a state in which there is a $k^{-th}$ piece of map expression data.

(Step S704) The score acquiring unit 133 acquires one or more attribute values paired with the $k^{-th}$ piece of map expression data, from the map expression data storage unit 111. The attribute values may contain the number of positions specified with the position specifying information contained in the position added map expression data.

(Step S705) The score acquiring unit 133 calculates a score for the $k^{-th}$ piece of map expression data, using the one or more attribute values acquired in step S704 or/and the history information acquired in step S701.

(Step S706) The score acquiring unit 133 accumulates the score calculated in step S705 in an unshown buffer in association with the $k^{-th}$ map identifier.

(Step S707) The score acquiring unit 133 increments the counter k by 1. The procedure returns to step S703.

(Step S708) The sorting unit 132 sorts map identifiers in descending order of the scores in the unshown buffer. The sorting unit 132 acquires map expression data identified with the map identifiers, in the sorting order, from the map expression data storage unit 111. The procedure returns to the upper-level processing.

Figure 8:
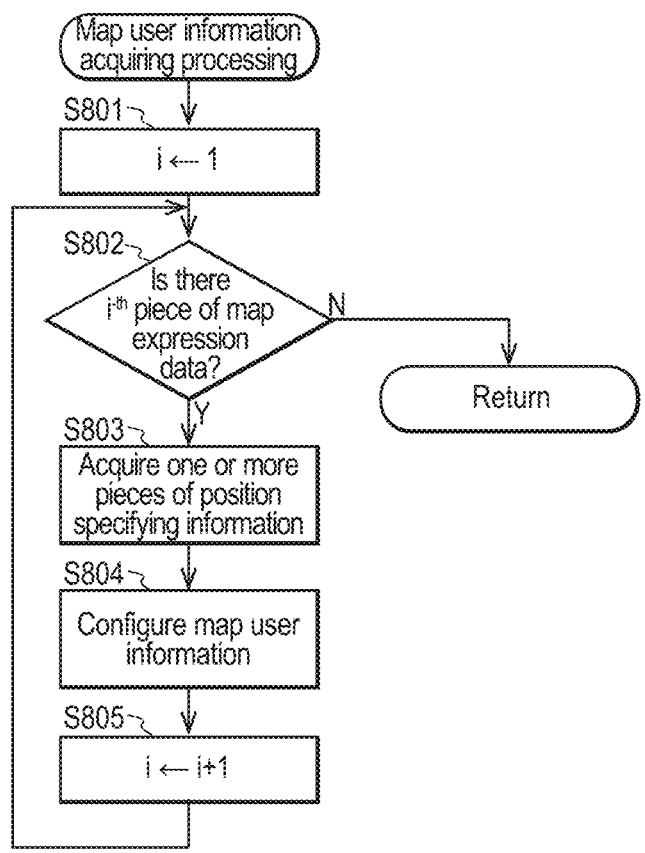
FIG. 8 is a flowchart illustrating map user information acquiring processing in this embodiment.

Next, the map user information acquiring processing in step S303 will be described with reference to the flowchart in FIG. 8.

(Step S801) The data acquiring unit 131 substitutes 1 for a counter i.

(Step S802) The data acquiring unit 131 judges whether or not there is an $i^{-th}$ piece of map expression data in the acquired map expression data. If there is an $i^{-th}$ piece of map expression data, the procedure advances to step S803, and, if otherwise, the procedure returns to the upper-level processing.

(Step S803) The data acquiring unit 131 acquires one or more pieces of position specifying information paired with the $i^{-th}$ piece of map expression data, from the position specifying information storage unit 113. The data acquiring unit 131 may acquire only position specifying information satisfying a predetermined condition, out of the one or more pieces of position specifying information paired with the $i^{-th}$ piece of map expression data.

(Step S804) The data acquiring unit 131 configures map user information, using the $i^{-th}$ piece of map expression data and the one or more pieces of position specifying information acquired in step S803. In this case, position added map expression data may be configured instead of map user information.

(Step S805) The data acquiring unit 131 increments the counter i by 1. The procedure returns to step S802.

Next, an operation of the terminal apparatus 2 will be described with reference to the flowchart in FIG. 9.

(Step S901) The terminal accepting unit 22 judges whether or not it has accepted a request instruction. If it has accepted a request instruction, the procedure advances to step S902, and, if otherwise, the procedure advances to step S908.

(Step S902) The terminal processing unit 23 judges whether or not map expression data or position added map expression data corresponding to the request instruction accepted in step S901 has been cached in an unshown buffer. If the data has been cached, the procedure advances to step S907, and, if otherwise, the procedure advances to step S903.

(Step S903) The terminal processing unit 23 acquires specifying information corresponding to the request instruction accepted in step S901. In this case, the terminal processing unit 23 acquires, for example, a user identifier from the terminal storage unit 21, and configures a request instruction having the specifying information and the user identifier.

(Step S904) The terminal transmitting unit 24 transmits the request instruction configured in step S903 to the information processing apparatus 1.

(Step S905) The terminal receiving unit 25 judges whether or not it has received one or at least two pieces of map user information from the information processing apparatus 1. If it has received map user information, the procedure advances to step S906, and, if otherwise, the procedure returns to step S905. The terminal receiving unit 25 may receive one or at least two pieces of map expression data, from the information processing apparatus 1, instead of one or at least two pieces of map user information. The terminal receiving unit 25 may receive one or at least two pieces of map user information and one or at least two pieces of map expression data, from the information processing apparatus 1.

(Step S906) The terminal processing unit 23 configures position added map expression data from the one or more pieces of map user information received in step S905, and accumulates it in an unshown buffer. If only map expression data is received in step S905, the processing in this step is not performed.

(Step S907) The terminal output unit 26 outputs the one or more pieces of position added map expression data in the buffer. The procedure returns to step S901. In this case, if there are multiple pieces of position added map expression data that are candidates for data that is to be output, the multiple pieces of position added map expression data may be output, or only the first position added map expression data in the sorting order may be output. The terminal output unit 26 may output only map expression data. The terminal output unit 26 may output position added map expression data and map expression data.

(Step S908) The terminal accepting unit 22 judges whether or not it has accepted an operation from a user. If it has accepted an operation, the procedure advances to step S909, and, if otherwise, the procedure advances to step S912.

(Step S909) The terminal processing unit 23 performs processing according to the operation accepted in step S908.

(Step S910) The terminal processing unit 23 acquires operation information corresponding to the operation accepted in step S908, and configures information that is to be transmitted to the information processing apparatus 1. Note that the information that is to be transmitted to the information processing apparatus 1 typically contains operation information and a user identifier, and is referred to as operation information or the like. The operation information may be primitive information of an operation (e.g., an ID of a button that has been pressed, information that has been input, etc.), or information (e.g., a map identifier of map expression data that has been browsed, a state in which map expression data is being browsed, a browsing time of map expression data, etc.) acquired from a group of one or more operations.

(Step S911) The terminal transmitting unit 24 transmits the operation information or the like configured in step S910, to the information processing apparatus 1. The procedure returns to step S901.

(Step S912) The terminal receiving unit 25 judges whether or not it has received the whole or part of map expression data or the like for cache. If it has received the map expression data or the like for cache, the procedure advances to step S913, and, if otherwise, the procedure advances to step S914. The map expression data or the like in this case is map expression data, map user information, or position added map expression data.

(Step S913) The terminal processing unit 23 accumulates the whole or part of the map expression data or the like for cache received in step S912 in an unshown buffer. The procedure returns to step S901.

(Step S914) The terminal processing unit 23 acquires position information indicating a current position.

(Step S915) The terminal processing unit 23 configures user position information having the position information acquired in step S914 and the user identifier.

(Step S916) The terminal transmitting unit 24 transmits the user position information configured in step S915, to the information processing apparatus 1. The procedure returns to step S901.

Figure 9:
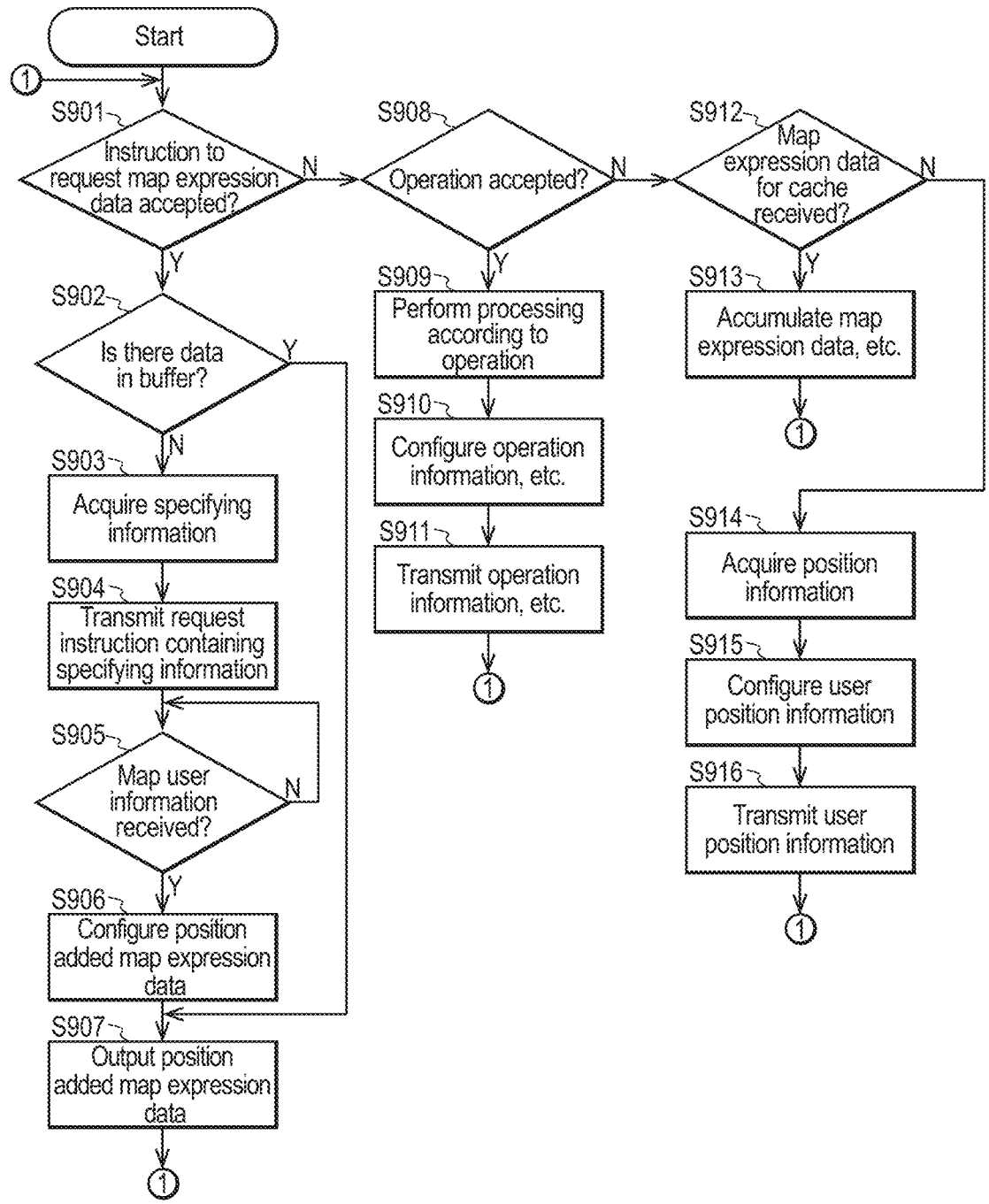
FIG. 9 is a flowchart illustrating an operation of a terminal apparatus 2 in this embodiment.

Note that, in the flowchart in FIG. 9, there is no limitation on the times or conditions for transmitting the user position information to the information processing apparatus 1. For example, in the terminal apparatus 2, the terminal transmitting unit 24 may transmit user position information to the information processing apparatus 1 only when position added map expression data or map expression data is being output. With this processing, only a position of a user who is browsing position added map expression data or map expression data is output to another the terminal apparatus 2.

In the flowchart in FIG. 9, processing ends at power off or at an interruption of ending processing.

Hereinafter, a specific operation of the information system A in this embodiment will be described. FIG. 1 is a conceptual diagram of an information system A.

It is assumed that, in the map expression data storage unit 111, the map expression data management table shown in FIG. 10 is stored. The map expression data management table manages one or more records each having "ID", "static attribute value", "dynamic attribute value", and "map expression data".

"ID" is a map identifier. "Static attribute value" is a static attribute value of map expression data, and, in this example, has region specifying information, a scale factor of map expression data, an area of map expression data, a completion level of map expression data, and metadata. The region specifying information is a group of (latitude, longitude), and, since the map expression data "ID=M01, M02" is in the shape of a rectangle, the region specifying information has information of (latitude, longitude) at the upper left point and the lower right point of the rectangle. Since the map expression data "ID=M03" has eight corners, the region specifying information has information of eight sets of (latitude, longitude). The metadata in this example is the type of map expression data. "Static attribute value" is, for example, information input by a company that operates the information processing apparatus 1.

"Dynamic attribute value" is a dynamic attribute value of map expression data, and, in this example, is user action information. The user action information in this example has "number of DLs", "number of views per month", "average access time", and "evaluation value". "Number of DLs" is the total number of times that data is downloaded to one or more terminal apparatuses 2 to the present, and displayed on one or more terminal apparatuses 2. Note that "number of DLs" may also be the total number of times that data is downloaded to one or more terminal apparatuses 2 to the present. "Number of views per month" is the total number of times that data is displayed on one or more terminal apparatuses 2 in that month or the previous month. "Average access time" is an average of time periods during which data is displayed on terminal apparatuses 2. "Evaluation value" is an average of evaluation values from users.

"Dynamic attribute value" is information acquired by the processing unit 13 of the information processing apparatus 1 using operation information received from the terminal apparatus 2. That is to say, for example, in the case in which map expression data is displayed on the terminal apparatus 2, the receiving unit 12 of the information processing apparatus 1 receives a map identifier of the displayed map expression data. The processing unit 13 increments "number of DLs" and "number of views per month" paired with the map identifier by 1. Note that, after a map identifier of the displayed map expression data is received, the processing unit 13 starts measurement of the display time period using an unshown clock.

"Flag" is a flag indicating whether or not to show a position specified with the position specifying information. In map expression data with "flag=0", a position specified with the position specifying information (a position of a user) is not shown. In map expression data with "flag=1", a position specified with the position specifying information (a position of a user) is allowed to be shown.

Note that "flag" may be a value that is input by an administrator or the like, or may be a value that is automatically acquired. The processing unit 13 may give, for example, a flag "1" to map expression data in which a predetermined condition is satisfied by one or more static attribute values, and give a flag "0" to map expression data in which a predetermined condition is not satisfied. The predetermined condition may be, for example, a condition using any one or more of the area, the scale factor, and metadata (type). The predetermined condition is, for example, "scale factor≥1/8000 & area≤10000". The predetermined condition is, for example, "metadata=old map".

Furthermore, in the case in which map expression data becomes undisplayed on the terminal apparatus 2, the receiving unit 12 of the information processing apparatus 1 receives information indicating that the data becomes undisplayed or a map identifier. The processing unit 13 acquires the time period during which the map expression data is displayed on the terminal apparatus 2 (time elapsed after the start of measurement of the display time period). The processing unit 13 changes "average access time" using this time period.

Furthermore, the receiving unit 12 of the information processing apparatus 1 receives a map identifier and an evaluation value from the terminal apparatus 2. The processing unit 13 changes the average of evaluation values paired with the map identifier. The processing unit 13 may calculate an evaluation value, using a dynamic attribute value. For example, the processing unit 13 calculates an evaluation value such that the larger any one or more of "number of DLs", "number of views per month", and "average access time" is, the higher the evaluation value is.

"Map expression data" in this example is image data. It will be appreciated that "map expression data" may also be an image file.

Furthermore, in the storage unit 11, information for deciding on a score of map expression data is stored. It is assumed that the information in this example is an operation expression. The operation expression is an expression using a distance between position indicated by position specifying information and a representative point of map expression data (which may be simply referred to as a "distance"), a scale factor, an area, a completion level, metadata, the number of DLs, the number of views per month, an average access time, and an evaluation value. The operation expression is an expression in which the smaller the distance is, the larger the score is, an expression in which the smaller the scale factor is, the larger the score is, an expression in which the smaller the area is, the larger the score is, an expression in which the higher the completion level is (the larger the value of the completion level is), the larger the score is, an expression in which the larger the number of DLs is, the larger the score is, an expression in which the larger the number of views per month, the larger the score is, an expression in which the longer the average access time is, the larger the score is, and an expression in which the larger the evaluation value is, the larger the score is. It is assumed that the storage unit 11 holds information on which a score corresponding to metadata is based. The information on which a score is based is, for example, "illustrated map=2, old map=3, sketch map=1", or the like. The information for deciding on a score of map expression data may also be a table. The table is a table in which the score is determined if a distance, a scale factor, an area, a completion level, metadata, the number of DLs, the number of views per month, an average access time, or an evaluation value is determined. Note that the information for deciding on a score of map expression data may also be information for deciding on a score, using one or at least two of a distance, a scale factor, an area, a completion level, metadata, the number of DLs, the number of views per month, an average access time, and an evaluation value.

Furthermore, in the user information storage unit 112, the user information management table shown in FIG. 11 is stored. The user information management table is a table for managing one or more pieces of user information. The user information in this case is, for example, information of a registered user. The user information has "user identifier", "user attribute", "history information", "current information", and "user flag". "User attribute" is an attribute value of a user, and, in this example, is "age" and "sex". "History information" is information regarding a history of map expression data browsed by a user, and, in this example, has "browsing date", "browsed map identifier", "browsing time", and "user position information". "Browsed map identifier" is a map identifier of map expression data that has been browsed. "Current information" is information regarding map expression data that is currently being browsed by a user. "Current information" in this example has "map identifier of current browsing" and "browsing time". "Map identifier of current browsing" is a map identifier of map expression data of current browsing. "User position information" is information indicating the latest position of the terminal apparatus 2. "User flag" is a flag indicating whether or not transmission of position specifying information of a user to another the terminal apparatus 2 is permitted. "User flag=1" indicates that transmission of position specifying information to another the terminal apparatus 2 is permitted, and "user flag=0" indicates that transmission of position specifying information to another the terminal apparatus 2 is not performed.

Furthermore, the storage unit 11 has the place name/position correspondence table shown in FIG. 12. The place name/position correspondence table is a table indicating correspondence between place name information and position information.

In this situation, the following four specific examples will be described. Specific Example 1 is an example in which one or more pieces of position added map expression data are displayed on the terminal apparatus 2 in the case in which the specifying information is position information indicating the current position of a user. In Specific Example 1, the position information that is added to map expression data is position information indicating a position of a user who is currently browsing the map expression data. Moreover, Specific Example 1 is an example in which the position added map expression data is configured by the terminal apparatus 2.

Specific Example 2 is an example in which one or more pieces of position added map expression data are displayed on the terminal apparatus 2 in the case in which the specifying information is place name information. In Specific Example 2, the position information that is added to map expression data is position information based on history information. More specifically, the position information that is added to map expression data is position information of a user who has previously browsed the map expression data. Moreover, Specific Example 2 is an example in which the position added map expression data is configured by the information processing apparatus 1.

Specific Example 3 is an example in which, when position added map expression data is displayed, a user inputs an instruction to request position added map expression data that is to be displayed next. In Specific Example 3, the position information that is added to map expression data is position information indicating a position of a user who is currently browsing the map expression data. Moreover, Specific Example 3 is an example in which the position added map expression data is configured by the information processing apparatus 1.

Specific Example 4 is an example in which position added map expression data for cache is downloaded to the terminal apparatus 2.

Specific Example 1

Figure 13:
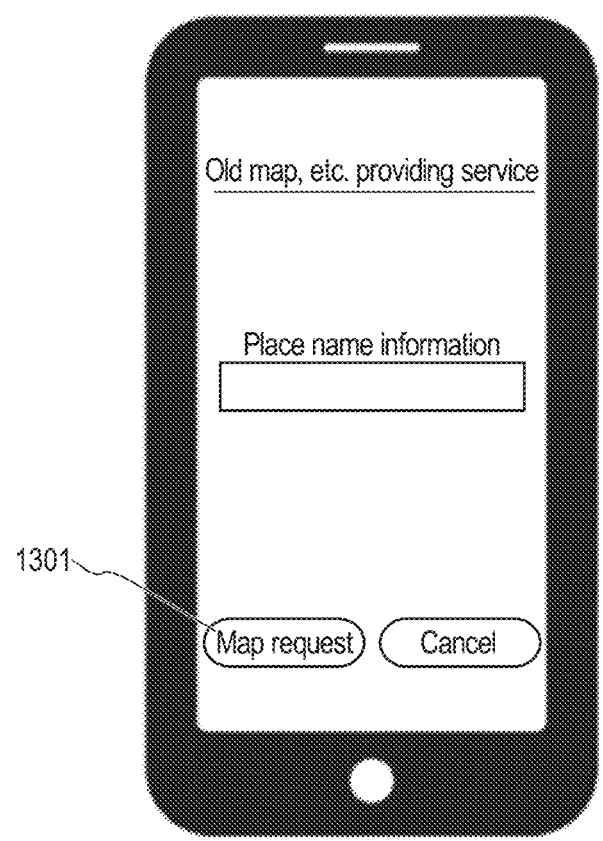
FIG. 13 shows an output example in this embodiment.

It is assumed that a screen of an app "old map, etc. providing service" shown in FIG. 13 is displayed on the terminal apparatus 2 of a user.

It is assumed that the user presses a map request button 1301 in FIG. 13 without inputting place name information. Then, the terminal accepting unit 22 accepts a request instruction. Next, since the accepted request instruction does not contain place name information, the terminal processing unit 23 acquires current position information $(x_c, y_c)$ indicating the current position. Then, the terminal processing unit 23 reads the user identifier "U02" from the terminal storage unit 21. Next, the terminal processing unit 23 configures a request instruction having the current position information $(x_c, y_c)$ and the user identifier "U02". Next, the terminal transmitting unit 24 transmits the request instruction to the information processing apparatus 1.

Next, the receiving unit 12 of the information processing apparatus 1 receives a request instruction having the current position information $(x_c, y_c)$ and the user identifier "U02", from the terminal apparatus 2.

Next, the data acquiring unit 131 acquires position information $(x_c, y_c)$ from the received request instruction. Then, the data acquiring unit 131 searches the map expression data management table in FIG. 10 for map expression data with a region containing the position information $(x_c, y_c)$. That is to say, the data acquiring unit 131 checks each record in the map expression data management table, as to whether or not the position information $(x_c, y_c)$ is contained in a region specified with the region specifying information of the record. It is assumed that the data acquiring unit 131 judges that the position information $(x_c, y_c)$ is contained in the regions specified with the region specifying information of the records with "ID=M02, M03". Then, the data acquiring unit 131 temporarily stores "M02, M03" in an unshown buffer.

Next, the score acquiring unit 133 acquires history information paired with the user identifier "U02" from the user information management table in FIG. 11. The score acquiring unit 133 acquires a static attribute value and a dynamic attribute value of each piece of map expression data M02 and M03. Then, the score acquiring unit 133 calculates a score of each piece of map expression data M02 and M03 through the above-described operation expression, using the acquired user's history information, and static attribute value and dynamic attribute value of the map expression data. It is assumed that the score acquiring unit 133 acquires a score "87" of M02 and a score "48" of M03. Next, the score acquiring unit 133 accumulates the scores in an unshown buffer in association with the map identifiers. That is to say, "(M02, 87), (M03, 48)" is accumulated in the unshown buffer.

Next, the sorting unit 132 sorts the map identifiers in descending order of the scores in the unshown buffer, thereby obtaining (M02, M03).

Next, the sorting unit 132 acquires the map expression data in the order of (M02, M03) from the map expression data management table.

Next, the data acquiring unit 131 acquires a flag "1" paired with the map identifier "M02" of the acquired map expression data. Then, the data acquiring unit 131 judges that a position specified with the position specifying information is allowed to be shown in map expression data with the map identifier "M02". In a similar manner, the data acquiring unit 131 judges that a position specified with the position specifying information is allowed to be shown in map expression data with the map identifier "M03".

Next, the data acquiring unit 131 acquires one or more pieces of position specifying information paired with each of the two acquired map expression data, for example, as follows. In this example, it is assumed that the data acquiring unit 131 acquires position information of a user who is currently browsing the map expression data.

That is to say, the data acquiring unit 131 acquires user identifiers "U01, U07" with "browsed map identifier" being "M02" in the user information management table in FIG. 11, for the map expression data M02. Then, the data acquiring unit 131 acquires a user flag "1" paired with the user identifiers "U01" and "U07", and judges that the positions of the users are allowed to be shown.

Then, the data acquiring unit 131 acquires user position information $(x_{01}, y_{01})$ paired with the user identifier "U01" and user position information $(x_{07}, y_{07})$ paired with the user identifier "U07", from the user information management table in FIG. 11. Then, the data acquiring unit 131 configures map user information having the map expression data M02, and the user position information $(x_{01}, y_{01})$ and $(x_{07}, y_{07})$. In this case, the map user information has region specifying information of the map expression data.

Next, the data acquiring unit 131 acquires user identifiers "U05, U09" with "browsed map identifier" being "M02" in the user information management table in FIG. 11, for the map expression data M03. Next, the data acquiring unit 131 acquires a user flag "1" paired with the user identifiers "U05" and "U09", and judges that the positions of the users are allowed to be shown.

Then, the data acquiring unit 131 acquires user position information $(x_{05}, y_{05})$ paired with the user identifier "U05" and user position information $(x_{09}, y_{09})$ paired with the user identifier "U09", from the user information management table in FIG. 11. Then, the data acquiring unit 131 configures map user information having the map expression data M03, and the user position information $(x_{05}, y_{05})$ and $(x_{09}, y_{09})$.

Next, the transmitting unit 14 transmits the two or more pieces of map user information to the terminal apparatus 2 of "U02". Then, the processing unit 13 changes the state information paired with the user identifier "U02" corresponding to the terminal apparatus 2 from which the request instruction was transmitted, to information that "M02" and "M03" have been downloaded, in response to transmission of the map user information.

Next, the terminal receiving unit 25 of the terminal apparatus 2 of "U02" receives the two pieces of map user information, from the information processing apparatus 1. Next, the terminal processing unit 23 accumulates the received two pieces of map user information in an unshown buffer in the order of (M02, M03). Next, the terminal processing unit 23 specifies positions indicated by the user position information $(x_{01}, y_{01})$ and $(x_{07}, y_{07})$ of the map user information "M02" at the first order in the buffer, on the map expression data M02, and configures position added map expression data by adding a predetermined pattern (e.g., an asterisk) to the positions. Next, the terminal output unit 26 displays the position added map expression data.

Figure 14:
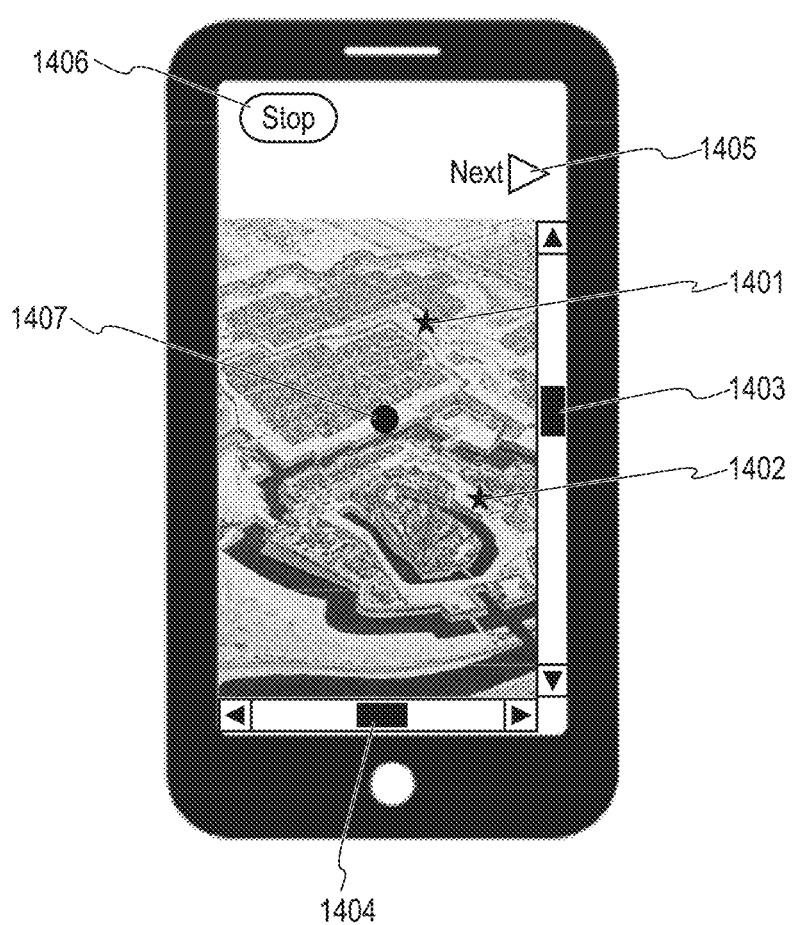
FIG. 14 shows an output example in this embodiment.

FIG. 14 shows the display example. In FIGS. 14, 1401 and 1402 denote positions on the map expression data respectively corresponding to $(x_{01}, y_{01})$ and $(x_{07}, y_{07})$ that are positions of other users. Scroll bars 1403 and 1404 in FIG. 14 are for scrolling position added map expression data. A button 1405 is for displaying next position added map expression data. A "stop" button 1406 is for ending display of map expression data. A mark 1407 is a mark (a black circle, in this example) indicating the current position $(x_c, y_c)$. The terminal processing unit 23 calculates coordinate values of the current position $(x_c, y_c)$ in the map expression data, using the region specifying information of the map expression data and the current position $(x_c, y_c)$.

Then, the terminal output unit 26 displays a mark at a point indicated by the coordinate values.

Figure 15:
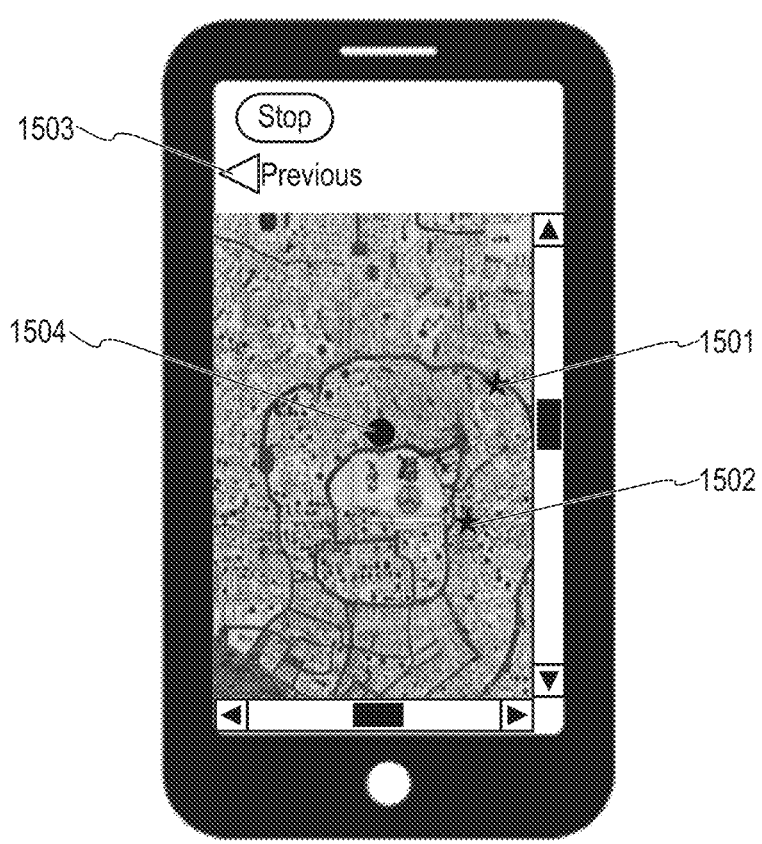
FIG. 15 shows an output example in this embodiment.

In this situation, if a user presses the button 1405, the map expression data that is displayed changes to the map expression data M03, and the display becomes the state shown in FIG. 15. In FIGS. 15, 1501 and 1502 denote positions on the map expression data respectively corresponding to $(x_{05}, y_{05})$ and $(x_{09}, y_{09})$ that are positions of other users "U05" and "U09". After it is detected that the button 1405 is pressed, the terminal processing unit 23 of the terminal apparatus 2 specifies positions indicated by the user position information $(x_{05}, y_{05})$ and $(x_{09}, y_{09})$ of the map user information "M03" at the first order in the buffer, on the map expression data M03, and configures position added map expression data by adding a predetermined pattern (e.g., an asterisk) to the positions. A button 1503 is for returning to the display of the map expression data "M02. A mark 1504 indicates the current position $(x_c, y_c)$.

Note that, in this specific example, a configuration may also be employed in which the terminal output unit 26 displays two pieces of position added map expression data corresponding to the received two pieces of map expression data of (M02, M03), in one screen. Furthermore, a configuration may also be employed in which the terminal accepting unit 22 accepts selection of position added map expression data by a user, and the terminal output unit 26 displays the selected position added map expression data.

Specific Example 2

It is assumed that a screen of an app "old map, etc. providing service" shown in FIG. 13 is displayed on the terminal apparatus 2 of a user identified with a user identifier "U01".

Figure 16:
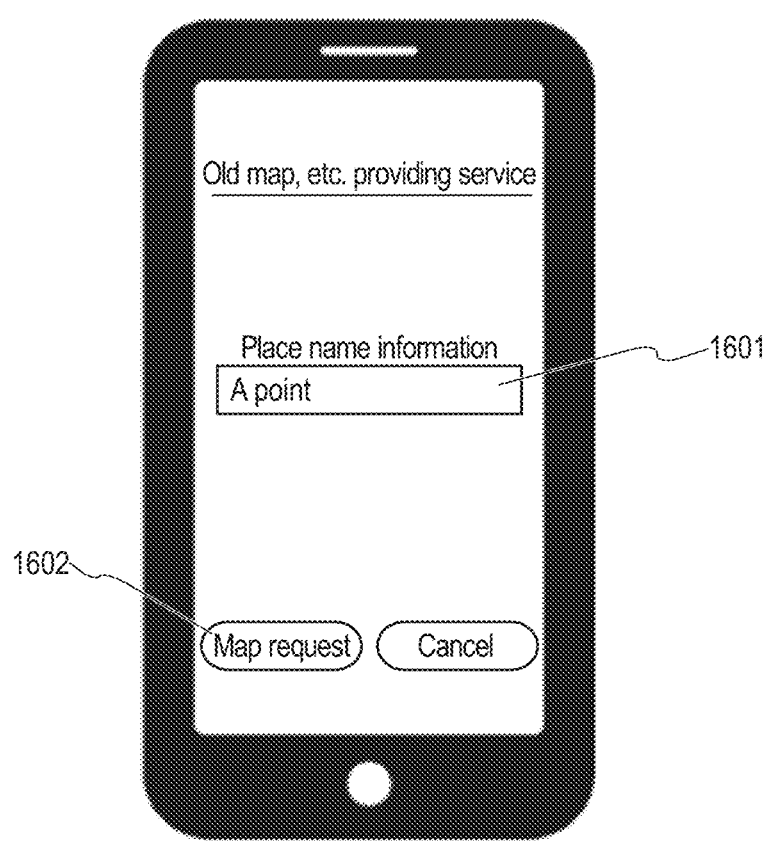
FIG. 16 shows an output example in this embodiment.

It is assumed that the user inputs place name information "A point" (see 1601 in FIG. 16), and presses a map request button 1602 in FIG. 16. Then, the terminal accepting unit 22 accepts an instruction to request map expression data. Next, since the accepted request instruction contains place name information, the terminal processing unit 23 acquires position specifying information "A point". Then, the terminal processing unit 23 reads the user identifier "U01" from the terminal storage unit 21. Next, the terminal processing unit 23 configures a request instruction having the position specifying information "A point" and the user identifier "U01". Next, the terminal transmitting unit 24 transmits the request instruction to the information processing apparatus 1.

Next, the receiving unit 12 of the information processing apparatus 1 receives the request instruction having the position specifying information "A point" and the user identifier "U01", from the terminal apparatus 2.

Next, the data acquiring unit 131 acquires position information $(x_a, y_a)$ paired with the received position specifying information "A point". Then, the data acquiring unit 131 searches the map expression data management table in FIG. 10 for map expression data with a region containing the position information $(x_a, y_a)$. It is assumed that the data acquiring unit 131 judges that the position information $(x_a, y_a)$ is contained in the regions specified with the region specifying information of the records with "ID=M02, M03". Then, the data acquiring unit 131 temporarily stores "M02, M03" in an unshown buffer.

Next, the score acquiring unit 133 acquires history information paired with the user identifier "U01" from the user information management table in FIG. 11. The score acquiring unit 133 acquires a static attribute value and a dynamic attribute value of each piece of map expression data M02 and M03. Then, the score acquiring unit 133 calculates a score of each piece of map expression data M02 and M03 through the above-described operation expression, using the acquired user's history information, and static attribute value and dynamic attribute value of the map expression data. It is assumed that the score acquiring unit 133 acquires a score "87" of M02 and a score "48" of M03. Next, the score acquiring unit 133 accumulates the scores in an unshown buffer in association with the map identifiers. That is to say, "(M02, 87), (M03, 48)" is accumulated in the unshown buffer.

Next, the sorting unit 132 sorts the map identifiers in descending order of the scores in the unshown buffer, thereby obtaining (M02, M03).

Next, the sorting unit 132 acquires only the map expression data "M02" at the first order, out of (M02, M03), from the map expression data management table.

Next, the data acquiring unit 131 acquires a flag "1" paired with the map identifier "M02" of the acquired map expression data. Then, the data acquiring unit 131 judges that a position specified with the position specifying information is allowed to be shown in map expression data with the map identifier "M02". In a similar manner, the data acquiring unit 131 judges that a position specified with the position specifying information is allowed to be shown in map expression data with the map identifier "M03".

Next, it is assumed that the data acquiring unit 131 acquires user identifiers "U03" and "U06" with the map identifier "M02" being contained in the history information, from the user information management table in FIG. 11. Then, the data acquiring unit 131 acquires a user flag "1" paired with the user identifier "U03", and judges that the position of the user "U03" is allowed to be shown. The data acquiring unit 131 acquires a user flag "1" paired with the user identifier "U06", and judges that the position of the user "U06" is allowed to be shown.

Then, the data acquiring unit 131 acquires user position information $(x_{03}, y_{03})$ paired with the user identifier "U03" and user position information $(x_{06}, y_{06})$ paired with the user identifier "U06", from the user information management table in FIG. 11. Then, the data acquiring unit 131 acquires region specifying information $(x_{21}, y_{21}) (x_{22}, y_{22})$ of the map expression data M02, from the table in FIG. 10. Then, the data acquiring unit 131 acquires relative positions $(X_{03}, Y_{03})$ and $(X_{06}, Y_{06})$ respectively indicated by the user position information $(x_{03}, y_{03})$ and $(x_{06}, y_{06})$, in a region indicated by the region specifying information. Then, the data acquiring unit 131 configures position added map expression data containing the map expression data M02, by adding a predetermined pattern (an asterisk, in this example) to the positions of coordinate values indicated by the relative positions $(X_{03}, Y_{03})$ and $(X_{06}, Y_{06})$. It is assumed that the position added map expression data contains the region specifying information.

Next, the transmitting unit 14 transmits the position added map expression data containing the map expression data M02 to the terminal apparatus 2 of "U01". Then, the processing unit 13 changes the state information paired with the user identifier "U01" corresponding to the terminal apparatus 2 from which the request instruction was transmitted, to information that "M02" has been downloaded, in response to transmission of the map user information.

Figure 17:
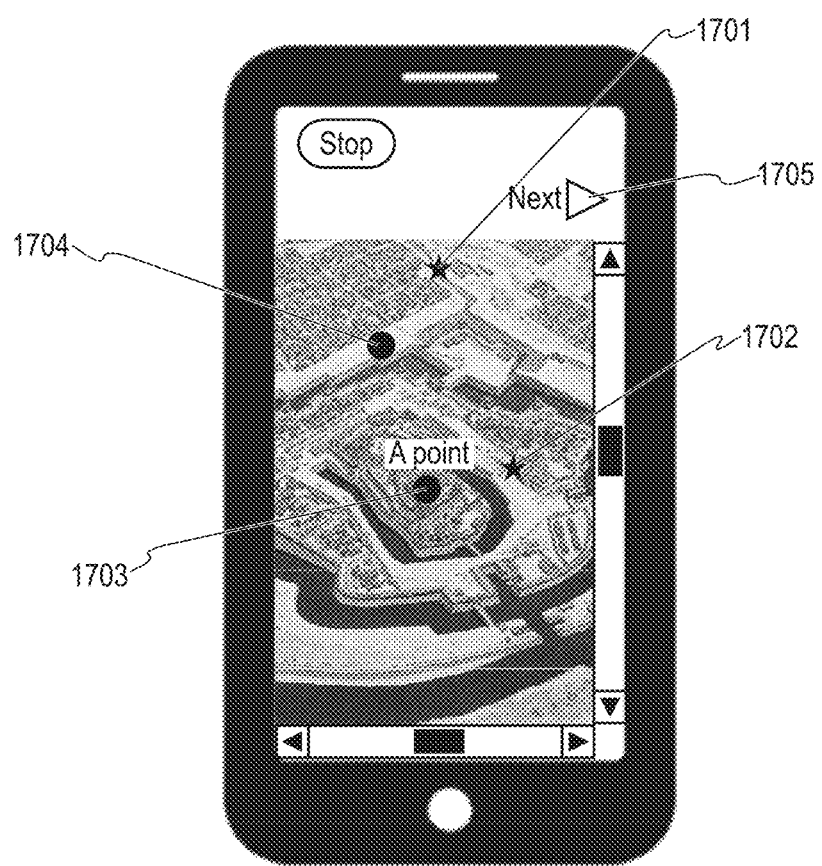
FIG. 17 shows an output example in this embodiment.

Next, the terminal receiving unit 25 of the terminal apparatus 2 receives the position added map expression data containing the map expression data M02, from the information processing apparatus 1. The terminal processing unit 23 acquires coordinate values corresponding to the position information ($x_a$, $y_a$) indicating the position of the point "A point" input by the user. Then, the terminal processing unit 23 adds a mark (a black rectangle, in this example) and the text "A point" to the received position added map expression data, at a position corresponding to the coordinate values. The terminal processing unit 23 acquires current position information ($x_{01}$, $y_{01}$), and calculates coordinate values of the current position ($x_{01}$, $y_{01}$) in the map expression data. Then, the terminal processing unit 23 adds a mark (a black circle, in this example) indicating the current position ($x_{01}$, $y_{01}$) to the position added map expression data. Next, the terminal output unit 26 outputs the position added map expression data to which the above-described marks. FIG. 17 shows the output example. In FIGS. 17, 1701 and 1702 denote positions of other users. 1703 denotes a position of the A point. 1704 denotes a current position. A button 1705 is for displaying next position added map expression data.

Furthermore, the terminal processing unit 23 of the terminal apparatus 2 configures operation information or the like (containing the user identifier "U01") indicating that the position added map expression data has been displayed, and the terminal transmitting unit 24 transmits the operation information or the like to the information processing apparatus 1.

Next, the receiving unit 12 of the information processing apparatus 1 receives the operation information or the like from the terminal apparatus 2. Then, the processing unit 13 accumulates the received operation information in the user information management table in association with the user identifier "U01". With this information, the browsed map identifier is set to "M02" in association with the user identifier "U01", and the browsing time starts to be updated.

Specific Example 3

In FIG. 17, it is assumed that, when the map expression data "M02" is displayed, a user presses a next button 1503. The next button 1705 is for searching for map expression data or the like, using the displayed position added map expression data.

Then, the terminal accepting unit 22 accepts a request instruction. Next, the terminal processing unit 23 acquires position specifying information (a map identifier "M02" of the displayed map expression data, in this example) corresponding to the accepted request instruction. Note that the terminal processing unit 23 may acquire a map identifier "M02" of the displayed map expression data and specific coordinate values of the displayed map (e.g., coordinate values at the center of the map in the display). Then, the terminal processing unit 23 acquires a user identifier "U01" from the terminal storage unit 21, and configures a request instruction having the specifying information "M02" and the user identifier "U01". Next, the terminal transmitting unit 24 transmits the request instruction containing the specifying information to the information processing apparatus 1.

Next, the receiving unit 12 of the information processing apparatus 1 receives the request instruction having the specifying information "M02" and the user identifier "U01".

Next, the data acquiring unit 131 acquires position information ($x_{M02}$, $y_{M02}$), using the received specifying information "M02". It is assumed that the position information ($x_{M02}$, $y_{M02}$) is information indicating a representative position (e.g., the center position) of the map expression data "M02", and is stored in the map expression data management table although not shown.

Next, the data acquiring unit 131 searches the map expression data management table in FIG. 10 for map expression data other than "M02", the data being map expression data with a region containing the position information ($x_{M02}$, $y_{M02}$). That is to say, the data acquiring unit 131 checks each record other than "M02" in the map expression data management table, as to whether or not the position information ($x_{M02}$, $y_{M02}$) is contained in a region specified with the region specifying information of the record. It is assumed that the data acquiring unit 131 judges that the position information ($x_{M02}$, $y_{M02}$) is contained in the region specified with the region specifying information of the records "ID=M03" and "ID=M11". Then, the data acquiring unit 131 acquires map expression data paired with "M03" from the map expression data management table.

Next, the data acquiring unit 131 acquires a flag "1" paired with the map identifier "M03" of the acquired map expression data. Then, the data acquiring unit 131 judges that a position specified with the position specifying information is allowed to be shown in map expression data with the map identifier "M03".

Furthermore, the data acquiring unit 131 acquires a flag "0" paired with the map identifier "M11" of the acquired map expression data. Then, the data acquiring unit 131 judges that a position specified with the position specifying information is not allowed to be shown in map expression data with the map identifier "M11".

Furthermore, it is assumed that the data acquiring unit 131 acquires user identifiers "U08" and "U23" of users who are currently browsing "M03". Then, the data acquiring unit 131 acquires a user flag "1" paired with the user identifier "U08", and judges that a position of the user is allowed to be shown. The data acquiring unit 131 acquires a user flag "0" paired with the paired with the user identifier "U23", and judges not to show a position of the user.

Next, the data acquiring unit 131 acquires user position information ($x_{08}$, $y_{08}$) paired with the user identifier "U08", from the user information management table in FIG. 11. Then, the data acquiring unit 131 acquires region specifying information of the map expression data M03, from the table in FIG. 10. Then, the data acquiring unit 131 acquires a relative position ($X_{08}$, $Y_{08}$) indicated by the user position information ($x_{08}$, $y_{08}$), in a region indicated by the region specifying information. Then, the data acquiring unit 131 configures position added map expression data containing the map expression data M03, by adding a predetermined pattern (an asterisk, in this example) to the position of coordinate values indicated by the relative position ($X_{08}$, $Y_{08}$).

Next, the transmitting unit 14 transmits the position added map expression data containing the map expression data M03 to the terminal apparatus 2 of "U01". Then, the processing unit 13 changes the state information paired with the user identifier "U01" corresponding to the terminal apparatus 2 from which the request instruction was transmitted, to information that "M03" has been downloaded, in response to transmission of the map user information.

Note that the transmitting unit 14 may also transmit the map expression data M11 to the terminal apparatus 2.

Next, the terminal receiving unit 25 of the terminal apparatus 2 receives the position added map expression data containing the map expression data M03, from the information processing apparatus 1. Next, the terminal output unit 26 displays the position added map expression data.

Furthermore, the terminal processing unit 23 of the terminal apparatus 2 configures operation information or the like of "M03" (containing the user identifier "U01") indicating that the position added map expression data has been displayed, and the terminal transmitting unit 24 transmits the operation information or the like to the information processing apparatus 1.

Note that, if the terminal apparatus 2 receives the map expression data M11 as well from the terminal apparatus 2, the map expression data may also be displayed.

Then, the receiving unit 12 of the information processing apparatus 1 receives the operation information or the like from the terminal apparatus 2. Then, the processing unit 13 accumulates the received operation information in the user information storage unit 112 in association with the user identifier "U01".

Specific Example 4

Next, it is assumed that the information processing apparatus 1 judges that the state in which a user "U01" has kept the terminal apparatus 2 displaying position added map expression data "M03" for one minute or more, and that there may be a request for next map expression data or the like. That is to say, the time period during which the same map expression data is displayed reaches a threshold (one minute, in this example), and the second data acquiring unit 134 judges to transmit map expression data that is to be cached by one terminal apparatus 2.

Next, the second data acquiring unit 134 acquires history information paired with the user identifier "U01" of the terminal apparatus 2 to which map expression data for cache is to be transmitted, from the user information management table.

It is assumed that the second data acquiring unit 134 acquires current information (a map identifier "M03" of current browsing, browsing time "1 m 02 s") paired with the user identifier "U01".

Next, the second data acquiring unit 134 acquires the type of map expression data "old map" preferred by the user, using the map identifiers "M09", "M01", and "M29" of past browsing in the history information and the map identifier "M03" of current browsing in the current information. Then, the second data acquiring unit 134 acquires position information ($x_{M03}$, $y_{M03}$) of a representative point of the map identifier "M03" of current browsing. Then, the second data acquiring unit 134 searches the map expression data management table for one or more pieces of map expression data with a region containing the position information ($x_{M03}$, $y_{M03}$) and paired with the metadata "old map".

Next, the score acquiring unit 133 calculates a score of each of the one or more pieces of map expression data obtained by the search, through the above-described algorithm.

Next, the second data acquiring unit 134 acquires one or more pieces of map expression data whose score is high enough to satisfy a predetermined condition. The state in which a score is high enough to satisfy a predetermined condition is, for example, a state in which the score is in the top N (N is a natural number of 1 or more) or the score is greater than or equal to a threshold.

Furthermore, the data acquiring unit 131 acquires user position information corresponding to the acquired one or more pieces of map expression data, through the above-described algorithm. Then, the data acquiring unit 131 configures one or more pieces of map user information or one or more pieces of position added map expression data.

Next, the transmitting unit 14 transmits the configured one or more pieces of map user information or one or more pieces of position added map expression data, or part thereof, to the terminal apparatus 2 with the user identifier "U01".

Next, the terminal receiving unit 25 of the terminal apparatus 2 receives the whole or part of the map user information or the like for cache. Next, the terminal processing unit 23 accumulates the received whole or part of the map user information or the like for cache, in an unshown buffer. The map user information or the like is map user information or position added map expression data.

Figure 18:
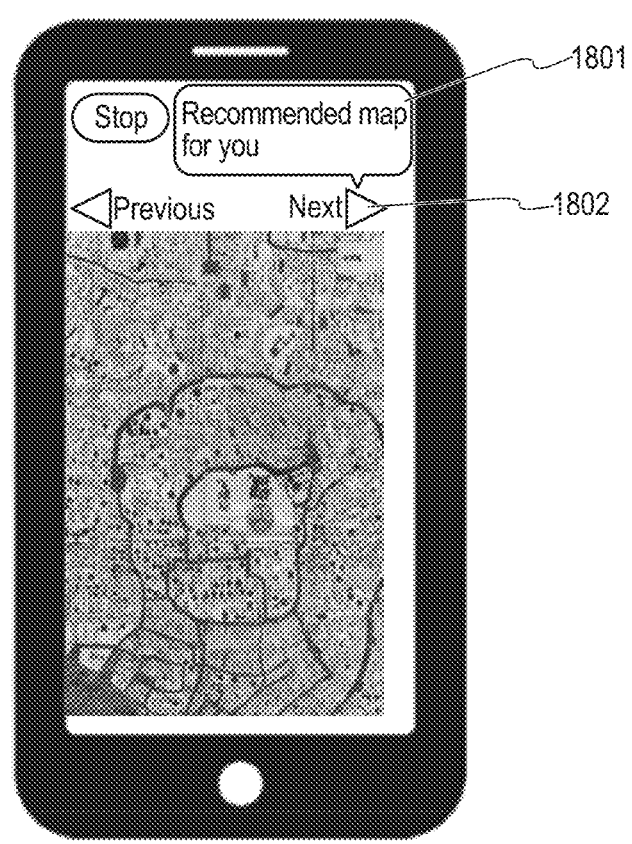
FIG. 18 shows an output example in this embodiment.

Then, the terminal output unit 26 performs display for a user indicating that there is next map expression data or the like recommended for a user. FIG. 18 shows the display example. That is to say, since the map expression data or the like is cached, the display on the terminal apparatus 2 changes to the state in FIG. 18. In FIG. 18, 1801 indicates that there is next map expression data or the like recommended for a user. Then, if the user presses a next button 1802, for example, position added map expression data that has been cached (stored in the buffer) is displayed on the terminal apparatus 2, or position added map expression data configured from the cached map user information is displayed on the terminal apparatus 2.

As described above, according to this embodiment, it is possible to show a position of another user, on map expression data. The showing a position of a user is typically arranging a pattern indicating a position of a user, on map expression data. The pattern is, for example, a graphic, a mark, text, or the like, or a combination thereof, and there is no limitation on the pattern as long as a position of a user can be indicated.

Furthermore, according to this embodiment, it is possible to show a position of another user satisfying a predetermined condition, on map expression data.

Furthermore, according to this embodiment, it is possible to show a position of a user, only on map expression data satisfying a predetermined condition.

Furthermore, according to this embodiment, it is possible to output position added map expression data showing a position of a terminal apparatus corresponding to the map expression data.

Furthermore, according to this embodiment, it is possible to easily provide a user with appropriate map expression data.

Furthermore, according to this embodiment, it is possible to easily provide a user with appropriate map expression data, in an appropriate order.

Moreover, according to this embodiment, it is possible to easily provide a user with appropriate map expression data, without stress.

The processing in this embodiment may be realized by software. The software may be distributed by software downloads or the like. Furthermore, the software may be distributed in a form where the software is stored in a storage medium such as a CD-ROM. Note that the same is applied to other embodiments described in this specification. The software that realizes the information processing apparatus 1 in this embodiment is the following sort of program. Specifically, this program is, for example, a program for causing a computer capable of accessing a storage medium including a map expression data storage unit in which two or more pieces of map expression data expressing a map are stored, the data being associated with one or more attribute values containing region specifying information for specifying a region that is being expressed, and a position specifying information storage unit in which position specifying information for specifying positions of one or more users is stored in association with each of the two or more pieces of map expression data, to function as: a request instruction receiving unit that receives a request instruction, which is an instruction to transmit map expression data and contains specifying information for specifying map expression data, from a terminal apparatus; a data acquiring unit that acquires map user information having map expression data specified with the specifying information contained in the request instruction, and one or more pieces of position specifying information associated with the map expression data; and a transmitting unit that transmits position added map expression data in which a position specified with the map user information acquired by the data acquiring unit or with the position specifying information contained in the map user information is shown on the map expression data, to the terminal apparatus.

Figure 19:
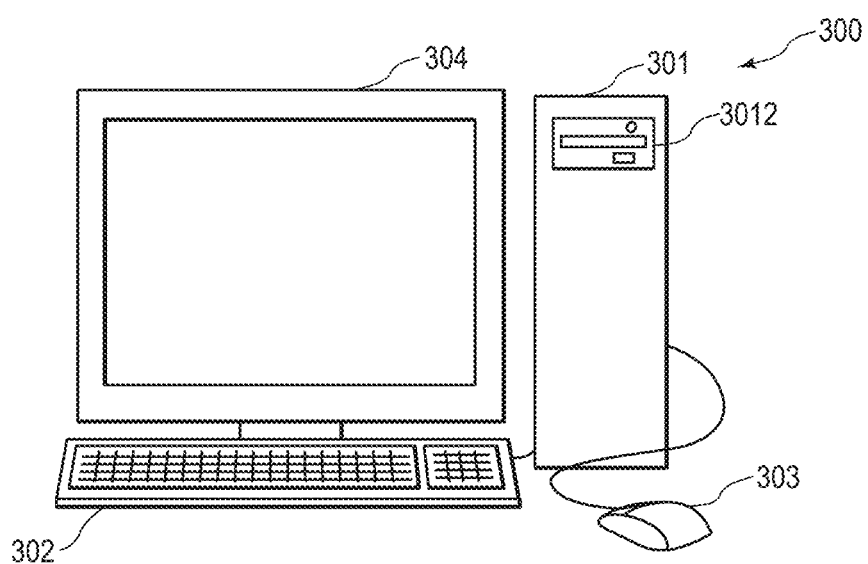
FIG. 19 is a schematic view of a computer system in this embodiment.
Figure 20:
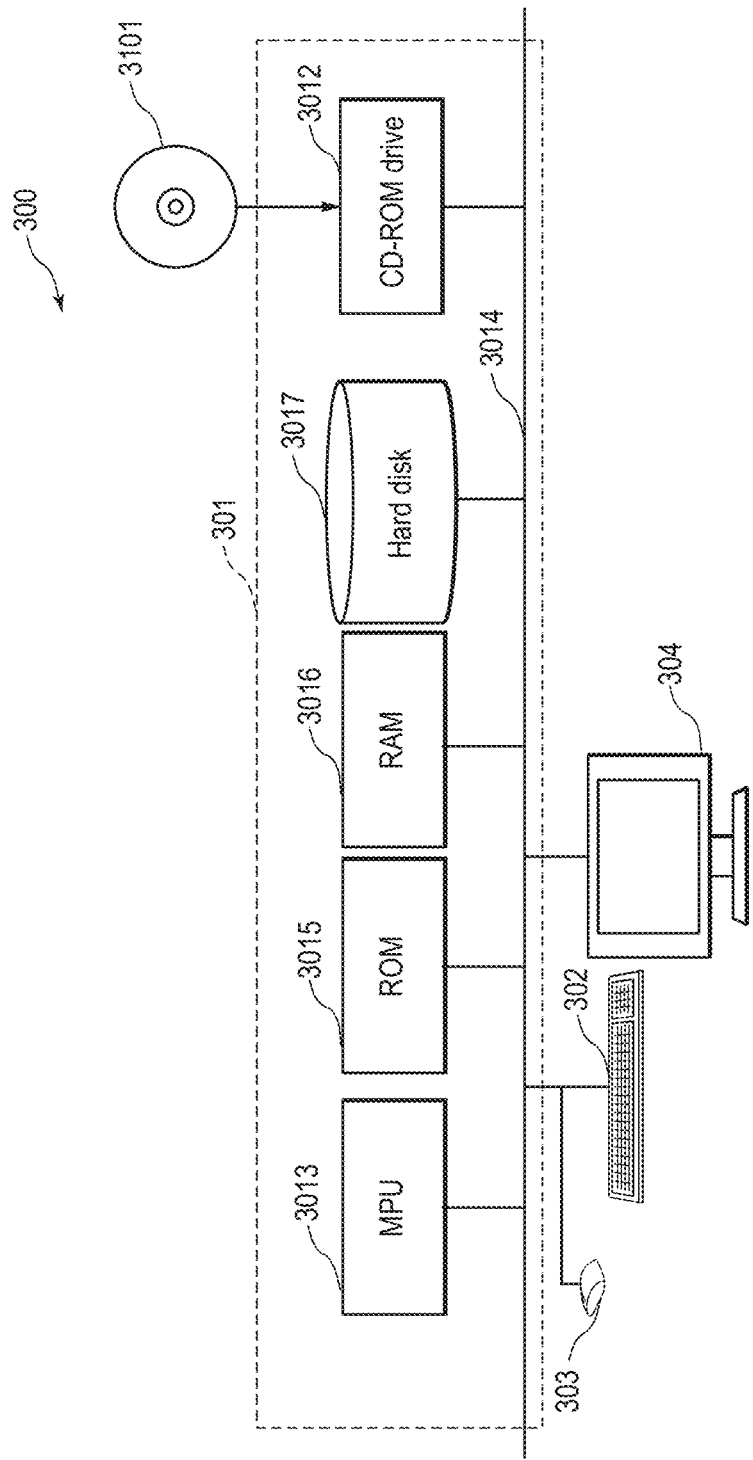
FIG. 20 is a block diagram of the computer system in this embodiment.

FIG. 19 shows the external appearance of a computer that executes the program described in this specification to realize the information processing apparatus and the like in the foregoing various embodiments. The foregoing embodiments may be realized using computer hardware and a computer program executed thereon. FIG. 19 is a schematic view of a computer system 300. FIG. 20 is a block diagram of the system 300.

In FIG. 19, the computer system 300 includes a computer 301 including a CD-ROM drive 3012, a keyboard 302, a mouse 303, and a monitor 304.

In FIG. 20, the computer 301 includes, in addition to the CD-ROM drive 3012, an MPU 3013, a bus 3014 connected to the CD-ROM drive 3012 and the like, a ROM 3015 in which a program such as a boot up program is stored, a RAM 3016 that is connected to the MPU 3013 and is a memory in which a command of an application program is temporarily stored and a temporary storage area is provided, and a hard disk 3017 in which an application program, a system program, and data are stored. Although not shown, the computer 301 may further include a network card that provides connection to a LAN.

The program for causing the computer system 300 to execute the functions of the information processing apparatus 1 and the like in the foregoing embodiments may be stored in a CD-ROM 3101 that is inserted into the CD-ROM drive 3012, and be transmitted to the hard disk 3017. Alternatively, the program may be transmitted via a network (not shown) to the computer 301 and stored in the hard disk 3017. At the time of execution, the program is loaded into the RAM 3016. The program may be loaded from the CD-ROM 3101, or directly from a network.

The program does not necessarily have to include, for example, an operating system (OS) or a third party program to cause the computer 301 to execute the functions of the information processing apparatus 1 and the like in the foregoing embodiments. The program may only include a command portion to call an appropriate function (module) in a controlled mode and obtain desired results. The manner in which the computer system 300 operates is well known, and thus a detailed description thereof has been omitted.

It should be noted that, in the program, in a step of transmitting information, a step of receiving information, or the like, processing that is performed by hardware, for example, processing performed by a modem or an interface card in the transmitting step (processing that can be performed only by hardware) is not included.

Furthermore, the computer that executes the program may be a single computer, or may be multiple computers. That is to say, centralized processing may be performed, or distributed processing may be performed.

Furthermore, in the foregoing embodiments, it will be appreciated that two or more communication parts in one apparatus may be physically realized by one medium.

In the foregoing embodiments, each process may be realized as centralized processing using a single apparatus, or may be realized as distributed processing using multiple apparatuses. That is to say, the information processing apparatus 1 may be a stand-alone apparatus.

The present invention is not limited to the embodiment set forth herein. Various modifications are possible within the scope of the present invention.

INDUSTRIAL APPLICABILITY

As described above, the information processing apparatus according to the present invention has the effect of making it possible to show a position of another user, on map expression data, and thus this apparatus is useful as a server apparatus and the like for providing map expression data.

LIST OF REFERENCE NUMERALS

1 Information processing apparatus
2 Terminal apparatus
11 Storage unit
12 Receiving unit
13 Processing unit
14 Transmitting unit
21 Terminal storage unit
22 Terminal accepting unit
23 Terminal processing unit
24 Terminal transmitting unit
25 Terminal receiving unit
26 Terminal output unit
111 Map expression data storage unit
112 User information storage unit
113 Position specifying information storage unit
121 User position information receiving unit
122 Request instruction receiving unit
131 Data acquiring unit
132 Sorting unit
133 Score acquiring unit
134 Second data acquiring unit

The invention claimed is:
1. An information processing apparatus comprising:
a user position information receiving unit that receives user position information having position specifying information and a user identifier, for two or more users, respectively;
a processing unit that stores the position specifying information in association with the user identifier, for the two or more users, respectively;
a map expression data storage unit in which two or more pieces of map expression data expressing a map are stored;
a position specifying information storage unit in which the position specifying information for specifying positions of the two more users, which is stored by the processing unit, is stored in association with each of the two or more pieces of map expression data, respectively, and with one or more conditions;
a request instruction receiving unit that receives a request instruction, which is an instruction to transmit map expression data and contains specifying information for specifying map expression data, from a terminal apparatus;

a data acquiring unit that acquires map user information having the map expression data specified with the specifying information contained in the request instruction, and two more pieces of position specifying information corresponding to the two or more users associated with the map expression data, and that generates position added map expression data by adding two or more positions corresponding to two or more pieces of position specifying information of the two or more users to the map expression data, wherein the data acquiring unit acquires the two or more pieces of position specifying information of which one of the one or more conditions satisfies a predetermined condition which allows adding a position specified with two or more pieces of the position specifying information is to be shown on the map expression data; and a transmitting unit that transmits the position added map expression data to the terminal apparatus, wherein:

the predetermined condition is a state in which the map expression data are being displayed on the terminal apparatus and one or more other terminal apparatuses, which correspond to the two or more positions.

2. The information processing apparatus according to claim 1, wherein the data acquisition unit adds the two or more positions to the map expression data when the map expression data satisfy a predetermined map condition.

3. The information processing apparatus according to claim 2, wherein when the map expression data do not satisfy the predetermined map condition, the transmitting unit transmits the map expression data without the two or more positions being added.

4. The information processing apparatus according to claim 1, further comprising a user information storage unit in which one or more pieces of user information having a user identifier for identifying a user are stored, for each of the two or more users, respectively, wherein the position specifying information in the position specifying information storage unit is associated with the user identifier, and the data acquisition unit adds the two or more positions to the map expression data when a flag associated with the user identifier allows position indication.

5. The information processing apparatus according to claim 1, wherein the transmitting unit transmits the position added map expression data, to the terminal apparatus only in a case in which the predetermined condition is satisfied.

6. An information system including the information processing apparatus according to claim 1, and two or more terminal apparatuses, wherein each of the two or more terminal apparatuses includes:

a terminal accepting unit that accepts a request instruction having specifying information;

a terminal transmitting unit that transmits the request instruction to the information processing apparatus;

a terminal receiving unit that receives map user information from the information processing apparatus, in response to transmission of the request instruction;

a terminal processing unit that configures position added map expression data in which a position specified with the position specifying information contained in the map user information is shown on the map expression data contained in the map user information; and a terminal output unit that outputs the position added map expression data.

7. The information processing apparatus according to claim 1, wherein:

a plurality of terminal apparatuses are communicable with the information processing apparatus, each of the plurality of terminal apparatuses stores map identification information for identifying map expression data currently being displayed thereon, and the data acquiring unit acquires the two more pieces of position specifying information corresponding to the two or more users of which terminal apparatus stores the map identification information which is same as the map identification information of the terminal apparatus.

8. An information processing apparatus comprising:

a user position information receiving unit that receives user position information having position specifying information and a user identifier, for two or more users, respectively;

a processing unit that stores the position specifying information in association with the user identifier, for the two or more users, respectively;

a map expression data storage unit in which two or more pieces of map expression data expressing a map, in which a geographical region expressed is limited, are stored, wherein the map expression data stored in the map expression data storage unit are associated with a flag or with one or more attribute values;

a position specifying information storage unit in which the position specifying information for specifying positions of the two more users, which is stored by the processing unit, is stored in association with each of the two or more pieces of map expression data, respectively, and with one or more conditions;

a request instruction receiving unit that receives a request instruction, which is an instruction to transmit map expression data and contains specifying information for specifying map expression data, from a terminal apparatus;

a data acquiring unit that acquires map user information having the map expression data specified with the specifying information contained in the request instruction, and two more pieces of position specifying information corresponding to the two or more users associated with the map expression data, and that generates position added map expression data by adding two or more positions corresponding to two or more pieces of position specifying information of the two or more users to the map expression data, wherein the data acquiring unit acquires the two more pieces of position specifying information of which one of the one or more conditions satisfies a predetermined condition which allows adding a position specified with two or more pieces of the position specifying information is to be shown on the map expression data; and a transmitting unit that transmits the position added map expression data to the terminal apparatus, wherein the data acquiring unit adds the two or more positions to the map expression data when the predetermined condition is satisfied, and the predetermined condition includes:

the flag associated with the map expression data indicates that a position specified with the position specifying information is to be shown on the map expression data, or the one or more attribute values associated with the map expression data indicates that a position specified with the position specifying information is to be shown on the map expression data.

9. The information processing apparatus according to claim 8, wherein the map expression data comprises an old map, an illustrated map or a sketch map.

10. An information processing method realized using a map expression data storage unit in which two or more pieces of map expression data expressing a map are stored, a position specifying information storage unit in which position specifying information for specifying positions of two or more users is stored in association with each of the two or more pieces of map expression data, respectively, a request instruction receiving unit, a data acquiring unit, and a transmitting unit, the method comprising:
- a user position information receiving step of receiving user position information having position specifying information and a user identifier, for the two or more users, respectively, and with one or more conditions;
- a storing step for storing the position specifying information in association with the user identifier, for the two or more users, respectively, into the position specifying information storage unit;
- a request instruction receiving step of the request instruction receiving unit receiving a request instruction, which is an instruction to transmit map expression data and contains specifying information for specifying map expression data, from the terminal apparatus;
- a data acquiring step of the data acquiring unit acquiring map user information having map expression data specified with the specifying information contained in the request instruction, and two or more pieces of position specifying information corresponding to the two or more users associated with the map expression data and generating position added map expression data by adding two or more positions corresponding to two more pieces of position specifying information of the two or more users to the map expression data, wherein in the data acquiring step, the two more pieces of position specifying information of which one of the one or more conditions satisfies a predetermined condition which allows adding a position specified with two or more pieces of the position specifying information is to be shown on the map expression data are acquired, and the two or more positions are added when the map expression data satisfy a predetermined map condition;
- a transmitting step of the transmitting unit transmitting the position added map expression data to the terminal apparatus,
- wherein the predetermined condition is a state in which the map expression data are being displayed on the terminal apparatus and one or more other terminal apparatuses, which correspond to the two or more positions.

11. The information processing method according to claim 10, wherein:
- a plurality of terminal apparatuses are communicable with the data acquiring unit,
- each of the plurality of terminal apparatuses stores map identification information for identifying map expression data currently being displayed thereon,
- the data acquiring unit acquires the two more pieces of position specifying information corresponding to the two or more users of which terminal apparatus stores the map identification information which is same as the map identification information of the terminal apparatus.

12. An information processing method realized using a map expression data storage unit in which two or more pieces of map expression data expressing a map, in which a geographical region expressed is limited, are stored, the map expression data stored in the map expression data storage unit being associated with a flag or one or more attribute values, a position specifying information storage unit in which position specifying information for specifying positions of two or more users is stored in association with each of the two or more pieces of map expression data, respectively, a request instruction receiving unit, a data acquiring unit, and a transmitting unit, the method comprising:
- a user position information receiving step of receiving user position information having position specifying information and a user identifier, for the two or more users, respectively, and with one or more conditions;
- a storing step for storing the position specifying information in association with the user identifier, for the two or more users, respectively, into the position specifying information storage unit;
- a request instruction receiving step of the request instruction receiving unit receiving a request instruction, which is an instruction to transmit map expression data and contains specifying information for specifying map expression data, from the terminal apparatus;
- a data acquiring step of the data acquiring unit acquiring map user information having map expression data specified with the specifying information contained in the request instruction, and two or more pieces of position specifying information corresponding to the two or more users associated with the map expression data and generating position added map expression data by adding two or more positions corresponding to two more pieces of position specifying information of the two or more users to the map expression data, wherein in the data acquiring step, the two more pieces of position specifying information of which one of the one or more conditions satisfies a predetermined condition which allows adding a position specified with two or more pieces of the position specifying information is to be shown on the map expression data are acquired, and the two or more positions are added when the map expression data satisfy a predetermined map condition;
- a transmitting step of the transmitting unit transmitting the position added map expression data to the terminal apparatus,
- wherein the data acquiring step includes adding the two or more positions to the map expression data when the predetermined condition is satisfied, and
- the predetermined condition includes:
- the flag associated with the map expression data indicates that a position specified with the position specifying information is to be shown on the map expression data, or
- the one or more attribute values associated with the map expression data indicates that a position specified with the position specifying information is to be shown on the map expression data.

13. The information processing method according to claim 12, wherein the map expression data comprises an old map, an illustrated map or a sketch map.

* * * * *